(12) United States Patent  
Tran et al.

(10) Patent No.: US 12,503,676 B2  
(45) Date of Patent: Dec. 23, 2025

(54) **APPARATUS, SYSTEM, AND METHODS FOR CULTIVATING GREEN MICRO ALGAE (*H. pluvialis*) AND FOR HARVESTNG ASTAXANTHIN THEREFROM**

(71) Applicants: Cuong Viet Tran, Ho Chi Minh (VN); Hung Hoang Nguyen, Ho Chi Minh (VN); My Hoa Tran Huynh, Ho Chi Minh (VN); Hieu Hoa Luong Nguyen, Ho Chi Minh (VN); Bich Ngoc Thi Nguyen, Ho Chi Minh (VN); Van Van Vu, Ho Chi Minh (VN)

(72) Inventors: Cuong Viet Tran, Ho Chi Minh (VN); Hung Hoang Nguyen, Ho Chi Minh (VN); My Hoa Tran Huynh, Ho Chi Minh (VN); Hieu Hoa Luong Nguyen, Ho Chi Minh (VN); Bich Ngoc Thi Nguyen, Ho Chi Minh (VN); Van Van Vu, Ho Chi Minh (VN)

(73) Assignee: NGUYEN TAT THANH UNIVERSITY, Ho Chi Minh (VN)

( * ) Notice: Subject to any disclaimer, the term of this patent is extended or adjusted under 35 U.S.C. 154(b) by 0 days.

(21) Appl. No.: 19/060,766

(22) Filed: Feb. 23, 2025

(65) Prior Publication Data  
US 2025/0270486 A1 Aug. 28, 2025

(51) Int. Cl.
| | |
|---|---|
| *C12M 1/00* | (2006.01) |
| *A01G 33/00* | (2006.01) |
| *C12M 1/34* | (2006.01) |
| *C12M 1/36* | (2006.01) |
| *C12M 3/00* | (2006.01) |

(Continued)

(52) U.S. Cl.  
CPC ............ *C12M 21/02* (2013.01); *A01G 33/00* (2013.01); *C12M 23/14* (2013.01); *C12M 23/22* (2013.01); *C12M 23/48* (2013.01); *C12M 29/00* (2013.01); *C12M 41/06* (2013.01); *C12M 41/12* (2013.01); *C12M 41/34* (2013.01); *C12M 41/40* (2013.01);

(Continued)

(58) Field of Classification Search  
CPC ...... C12M 21/02; C12M 23/14; C12M 23/22; C12M 23/48; C12M 29/00; C12M 41/12; C12M 41/34; C12M 41/40; C12M 41/48; C12M 47/10; C12N 1/125; C12R 2001/89  
USPC .......................................... 435/292.1; 47/1.4  
See application file for complete search history.

(56) References Cited

U.S. PATENT DOCUMENTS

| | | | | |
|---|---|---|---|---|
| 2008/0274494 | A1* | 11/2008 | Kertz ..................... | C12N 1/12 435/257.1 |
| 2009/0047722 | A1* | 2/2009 | Wilkerson ............. | C12M 31/10 435/257.1 |

(Continued)

*Primary Examiner* — Michael L Hobbs

(57) ABSTRACT

An assembly, methods, and a network for farming and culturing green microalgae (*Haematococcus pluvialis*) are disclosed. The assembly includes a mechanical support framework; a plurality of cultivation pouches, mechanically coupled to the mechanical support framework, where green microalgae (*H. pluvialis*) are cultured and harvested; a plurality of light emitting diodes (LEDs), mechanically coupled and supported by the mechanical support framework and arranged in between two cultivation pouches, operable to provide a predetermined light intensities to the cultivation pouches; and an air and gas supply and distribution unit, mechanically coupled and supported by the mechanical support framework, operable to supply predetermined amounts of air and carbon dioxide ($CO_2$) to the cultivation pouches.

20 Claims, 16 Drawing Sheets

(51) Int. Cl.
*C12N 1/12* (2006.01)
*C12R 1/89* (2006.01)

(52) U.S. Cl.
CPC ............ *C12M 41/48* (2013.01); *C12M 47/10* (2013.01); *C12N 1/125* (2021.05); *C12R 2001/89* (2021.05)

(56) References Cited

U.S. PATENT DOCUMENTS

| | | | | |
|---|---|---|---|---|
| 2010/0112700 | A1* | 5/2010 | Shaaltiel | C12M 23/28 435/410 |
| 2014/0322804 | A1* | 10/2014 | Boily | C12N 1/12 435/292.1 |

* cited by examiner

APPARATUS, SYSTEM, AND METHODS FOR CULTIVATING GREEN MICRO ALGAE (*H. pluvialis*) AND FOR HARVESTNG ASTAXANTHIN THEREFROM

CLAIM OF PRIORITY

This application claims priorities under 35 U.S.C. § 119 (a)-(d) of Applications No. 1-2024-05237 entitled "Hệ Thống Sản Xuất Vi Tảo Lục *Haematococcus Pluvialis*", filed on Jul. 16, 2024; which claims priority of a patent application No. 1-2024-04312 entitled "Phương Pháp Sản Xuất Astaxanthin từ Vi Tảo Lục *Haematococcus Pluvialis*" filed on Jun. 12, 2024; which claims priority of a patent application No. 1-2024-01264 entitled "Thiết Bị Nuôi Vi Tảo Lục *Haematococcus Pluvialis*" filed on Feb. 22, 2024; which claims priority of a patent application No. 1-2024-01265, entitled "Phương Pháp Nuôi Vi Tảo Lục *Haematococcus Pluvialis*" filed on Feb. 22, 2024; all in the Republic Socialist of Vietnam. These patent applications identified above are incorporated herein by reference in its entirety.

FIELD OF THE INVENTION

The present invention relates generally to farming apparatus and technique. Specifically, the present invention referring to system and apparatus for farming and harvesting green microalgae *Haematococcus pluvialis* (*H. pluvialis*) and astaxanthin.

BACKGROUND ART

Among many species of microalga, *Haematococcus pluvialis* has the highest source of natural astaxanthin that they are called "super anti-oxidant." Currently, the majority of astanxathin used in aquaculture is synthetic. Natural astaxanthin produced by *H. pluvialis* has significantly greater antioxidant capacity than the synthetic one. Astaxanthin has been used in the nutraceuticals, cosmetics, food, and aquaculture industries. It is now evident that, astaxanthin can significantly reduce free radicals and oxidative stress that improves human health. In addition, green microalgae (*H. pluvialis*) can act as a phytoremediation agent that absorbs pollutants such as carbon dioxide (CO2) and convert to biomass with high value compounds such as astanxanthin.

For the above reasons, the need to cultivate green microalgae (*Haematococcus pluvialis* '*H. pluvialis*') on an industrial scale for large yields and high astaxanthin content is ever increased. Technical improvements in the farming process has been applied over the years with the aim of achieving economic efficiency, high yield, stable quality, and industrial scale. Many algae farming models attempting to meet the above needs have been researched and developed.

One of the major problems in the current large-scale algae farming models is economic efficiency. That is, when culturing algae in large volume, bacterial infections often occur and cannot be avoided and controlled. Consequently, when infections occur, all algae in the same tank must be completely eliminated, leading to a huge economic loss.

Cultivation of microalgae requires light, carbon dioxide ($CO_2$), nutrients (nitrogen, phosphorus, and sulfur), and various trace elements. Controlling light to allow algae to grow in the green phase as well as in the inhibition phase requires different light controlling at different stage of cultivation. Using a light source to evenly illuminate the algae cultivation volume is of major concern. The light source must be able to change intensity, time, and location to avoid bacterial contamination of the algae.

Previous attempts to solve the problems related to the cultivation of green microalga *H. pluvialis* include:

In the U.S. Pat. No. 6,022,701 entiled "Procedure for Large-Scale Production of Astaxanthin From *Haematococcus*" by Bousillba et al., issued on Feb. 8, 2000, a *Haematococcus* algael cell culture process for the large-scale production of astaxanthin-rich *Haematococcus* cells includes: culturing *Haematococcus* cells in conditions suitable for optimal vegetative growth under a light intensity of about 30-140 µmol photons.$m^{-2} \cdot S^{-1}$ and at a temperature of about 15° C.-28° C.; and collecting the grown cells that was cultured to accumulate astaxanthin in water supplemented with $CO_2$ at temperatures below 35° C. However, the astaxanthin content of the disclosed process is only about 4%.

In another US patent application No. US2015/0252391A1, entitled "Method using Microalgae for High-Efficiency Production of Astaxanthin" by Li et al., published on Sep. 10, 2015, a method of producing astaxanthin or increasing astaxanthin content in microalgae is disclosed which includes: culturing microalgae by heterotrophic method; which adds a heterotrophic medium at pH 4.0-10, at a culture temperature of 10-40° C. and with dissolved oxygen above 0.1%; and collecting and diluting the heterotrophic microalgae culture medium and then adding photo induction medium to the heterotrophic microalgae culture medium for photo induction; or directly generating photo-chemistry to cultivate microalgae to obtain heterotrophs. The disclosed steps aim to produce astaxanthin or increase astaxanthin content in microalgae, at photo induced temperature of 5° C.-50° C., with continuous or intermittent light intensity of 0.1-150 klx for periods from 1 hour to 480 hours. However, the astaxanthin content of the disclosed method is only less than 3%.

In the hot climate conditions of Vietnam, the infection from the air of fungal spores during microalgae cultivation processes in the algae farming area is very large. Even if controlled, this infection cannot be avoided.

Therefore, there is a need for a microalgae farming apparatus capable of controlling light intensities at any location and any phase of microalgae cultivation.

There is a need for a large-scale microalgae farming apparatus and process that are simple, convenience, and cost saving.

There is a need for a microalgae farming apparatus and process that produces high yield of astaxanthin.

There is a need for a microalgae farming apparatus and process that minimizes viral infection from the air.

The methods and apparatus of the present invention meet the above needs and solve the above-described problems.

SUMMARY OF THE INVENTION

Accordingly, an object of the present invention is to provide Assembly, methods, and network for farming and culturing green microalgae (*Haematococcus pluvialis*) are disclosed, comprising: a mechanical support framework; a plurality of cultivation pouches, mechanically coupled to the mechanical support framework, having arrays of cultivation pouches where green microalgae (*H. pluvialis*) are cultured and harvested; a plurality of light emitting diodes (LEDs), mechanically coupled and supported by the mechanical support framework and arranged in between two of any adjacent arrays of cultivation pouches, operable to provide a predetermined light intensities to each of the cultivation pouches; and an air and gas supply and distribution unit, mechanically coupled and supported by the mechanical support framework, operable to supply predetermined amounts of air and carbon dioxide ($CO_2$) to each of the green microalgae pouches.

Another object of the present invention is provide a method of cultivating and harvesting green microalgae (*H. pluvialis*) that comprises: (a) constructing a mechanical support framework that supports habitats for green microalgae at predetermined light intensities and predetermined pressures and temperatures; (b) forming the habitats for the green microalgae (*H. pluvialis*) by using an optimal biomass growing media; (c) proliferating the green microalgae (*H. pluvialis*) by controlling a plurality of LED lights and a $CO_2$ source and an air pump to generate a predetermined light intensities at 10 µmol photons/m²/s for 5 days and a temperature of 20° C. to 25° C. and; and (d) proliferating the microalgae (*H. pluvialis*) further by varying the temperatures from 28° C. to 30° C. and the predetermined light intensities to 400 µmol photons/m²/s.

Another object of the present invention is to obtain a method and apparatus for farming and harvesting of green microalgae that have high astaxanthin yield above 5%.

Another object of the present invention is to obtain a method and apparatus for farming and harvesting of green microalgae that minimizes viral infection during the all cultivation phases.

Another object of the present invention is to obtain a method and apparatus for farming and harvesting of green microalgae that achieves industrial scale production.

Another object of the present invention is to obtain a method and apparatus for networking a plurality of microalgae apparatuses together that can share information to reduce infection, errors, and to increase overall efficiency and total production.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, explain the principles of the invention.

The above figures are for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the scope of the present description, the reference to "an embodiment" or "the embodiment" or "some embodiments" means that a particular feature, structure, or element described with reference to an embodiment is comprised in at least one embodiment of the described object. The sentences "in an embodiment," "in the embodiment," or "in some embodiments" in the description do not, therefore, necessarily refer to the same embodiment or embodiments. The features, structures, or elements can be furthermore combined in any adequate way in one or more embodiments.

Figure 1:
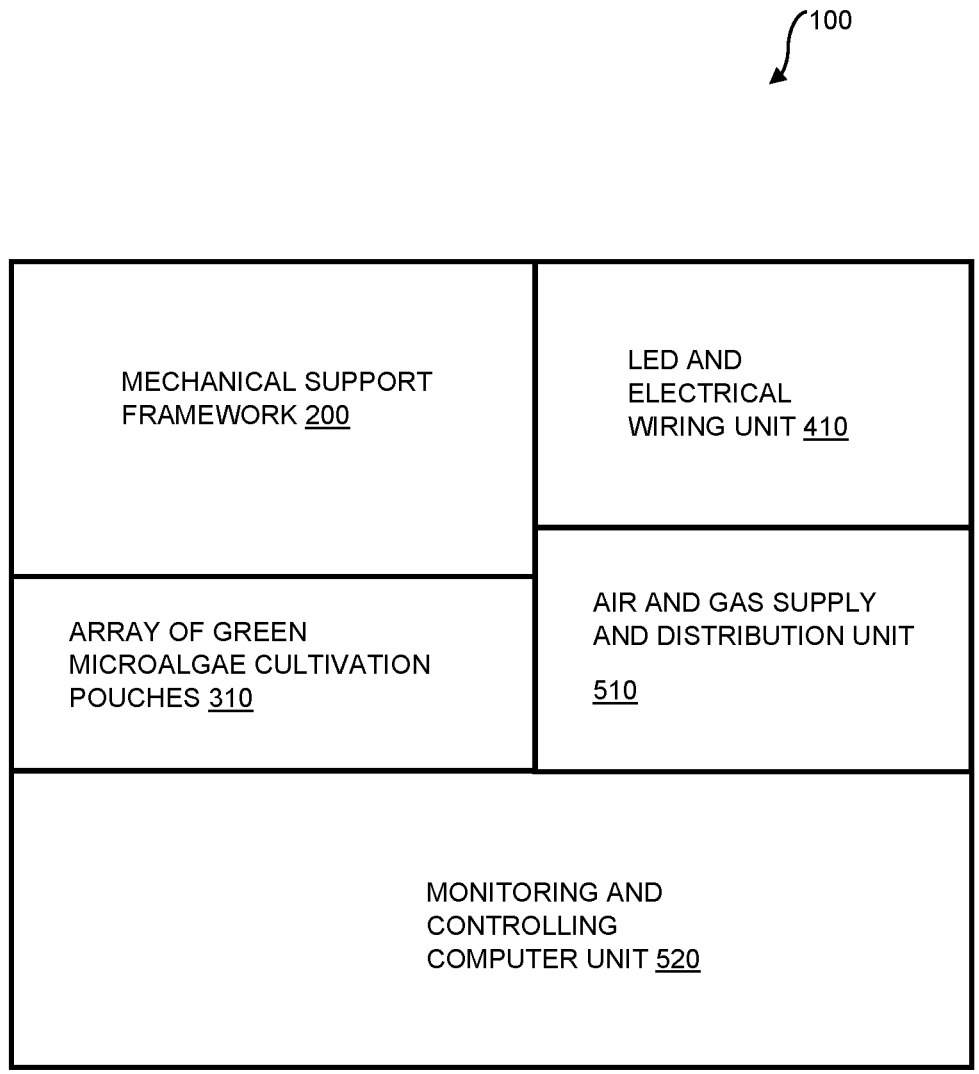
FIG. 1 shows an overall conceptual representation of a green microalgae (*Haematococcus pluvialis*) farming assembly (apparatus) in accordance with an exemplary embodiment of the present invention.

Beginning with FIG. 1, an overall conceptual design of a green microalgae (*Haematococcus pluvialis*) farming assembly or apparatus 100 (hereinafter referred to as "farming assembly 100") in accordance with an exemplary embodiment of the present invention is illustrated. Farming assembly 100 is a modular, portable, high-yield, and infection free device that is inexpensive to build and easy to assemble. Farming assembly 100 includes five main units that work together to achieve the above-listed objectives of the present invention: a mechanical support framework 200 (framework 200), an array of green microalgae cultivation chambers or pouches 310 (array of cultivation pouches 310), an array of light emitting diode (LEDs) and electrical wiring unit 410 (array of LEDs 410), an air and gas supply and distribution unit 510 (air and gas supply unit 510), and a monitoring and controlling unit 520 (computer 520). Mechanical support framework 200 is designed to house, support, and protect array of cultivation pouches 310, array of LEDs unit 410, air and gas supply unit 510, and computer 520. Array of cultivation pouches 310 contains a substrate (medium) where green microalgae (*H. pluvialis*) proliferates and accumulates until harvest. Array of LEDs 410 is arranged next to each of array of cultivation pouches 310 to provide vital light sources to the green microalgae. Air and gas distribution unit 510 provides air and $CO_2$ gas to array of cultivation pouches 310. As its name suggests, computer 520 receives feedback information regarding the substrate inside array of cultivation pouches 310 and issues appropriate instructions. These instructions adjust the correct amount of light, air, temperature, pressure, and $CO_2$ gas to array of cultivation pouches 310. In other embodiments of the present invention, computer 520 is networked with farming assemblies 100 from different geographical locations. This networking feature of the present invention helps realizing the modularity feature, sharing vital information that reduce errors, avoiding infectiosn, increasing efficiency and thus industrial production scale of each farming assembly 100. Farming assembly 100 also provides means to realize different methods for culturing and harvesting green microalgae (*H. pluvialis*) of the present invention.

Next, FIG. 2 to FIG. 5, individually or in combination, disclose exemplary embodiments of the mechanical support framework 200 (support framework 200), array of cultivation pouches 310, array of LEDs 410, air and gas distribution unit 510, and computer 520.

Figure 2:
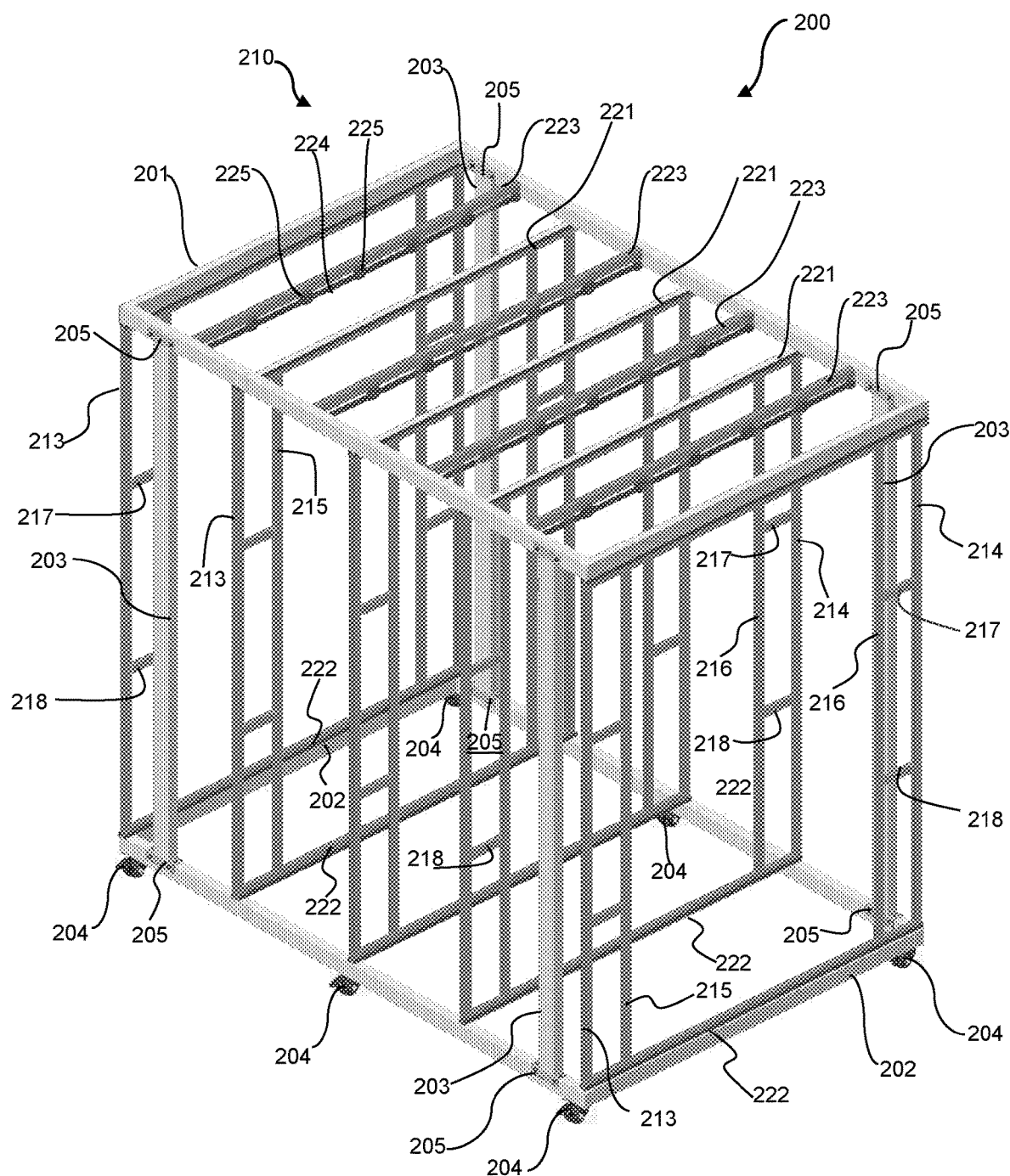
FIG. 2 shows a perspective view of the mechanical support framework of the green microalga (*H. pluvialis*) farming assembly in accordance with an exemplary embodiment of the present invention.
Figure 3:
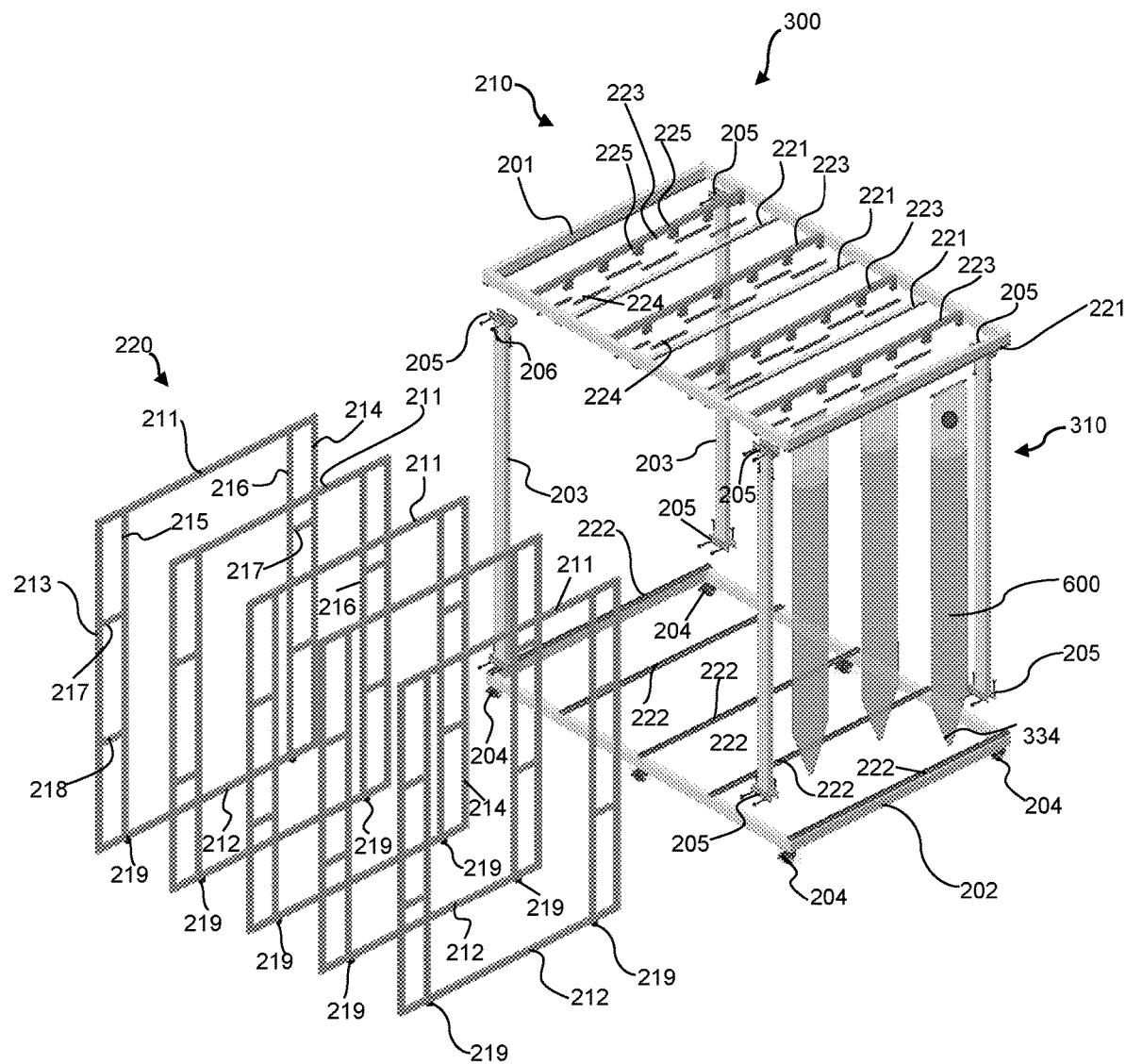
FIG. 3 shows a perspective arrangement of the cultivation pouches (chambers) of the green microalga farming assembly in accordance with an exemplary embodiment of the present invention.

Now referring to FIG. 2, a perspective view of support framework 200 of the green microalga (*H. pluvialis*) farming assembly 100 in accordance with an exemplary embodiment of the present invention is illustrated. Support framework 200 functions as a skeletal support of farming assembly 100. It houses, supports, and protects array of cultivation pouches 310, array of LEDs 410, air and gas distribution unit 510, and computer 520. Referring also to FIG. 3, in various embodiments of the present invention, support framework 200 is a cuboid—a 3D shape having six faces and each face is a rectangle, also known as rectangular box shape. Support framework 200 further includes a main housing subunit 210 including a top rectangular frame 201, a bottom rectangular frame 202, and columns 203—all are secured together by hinges 205 and screws 206. At the four corners or vertices of bottom rectangular frame 202, trolley or caster wheels 204 are attached. Support framework 200 also includes a LED support subunit 220 which is rectangular in shape and has the same dimension as support framework 200. LED support subunit 220 includes a top bar 211, a bottom bar 212, outer side bars 213-214, inner side bars 215-216, and girts 217-218. A pair of sliding wheels 219 is attached to bottom bar 212. Pair of sliding wheels 219 helps LED support subunit 210 sliding in and out of main housing subunit 210 via bottom slider tracks 222. Support framework 200 also includes top slider tracks 221 and bottom slider tracks 222 for receiving LED support subunit 220. Top slider tracks 221 are parallel to one another and affixed to top rectangular frame 201. Similarly, bottom slider tracks 222 are parallel to one another and secured to bottom rectangular frame 202. As shown in FIG. 2-FIG. 5 of the present invention, there are five top slider tracks 221 for coupling array of LED lights 310. Intervening between top slider tracks 221 are pouch supporting bars 223. Each pouch supporting bar 223 includes a series of hangers 225 and clip lines 224. Clip line 224 seals off each cultivation pouch and is hung on to two adjacent hangers 225.

Continuing with FIG. 3, a perspective the structure and arrangement 300 of cultivation chambers (pouch) 310 of farming assembly 200 in accordance with an exemplary embodiment of the present invention is also illustrated. Array of cultivation pouches 310 contains a plurality of independent cultivation pouches 600. Each cultivation pouch 600 is made of a soft durable and transparent medical grade plastic material such as polyethylene or linear low-density polyethylene (LLDPE). Each pouch supporting bar 223 hangs six single cultivation pouches 600 by means of hangers 225 and clip lines 224. Each pouch supporting bar 223 is placed between two top slider tracks 221 so that LEDs 411 illuminate array of cultivation pouches 310. As shown in FIG. 2-FIG. 3, there are four pouch supporting bars 223 connected to top rectangular frame 201. For the description of an individual cultivation pouch 600 please also refer to FIG. 6.

Figure 4:
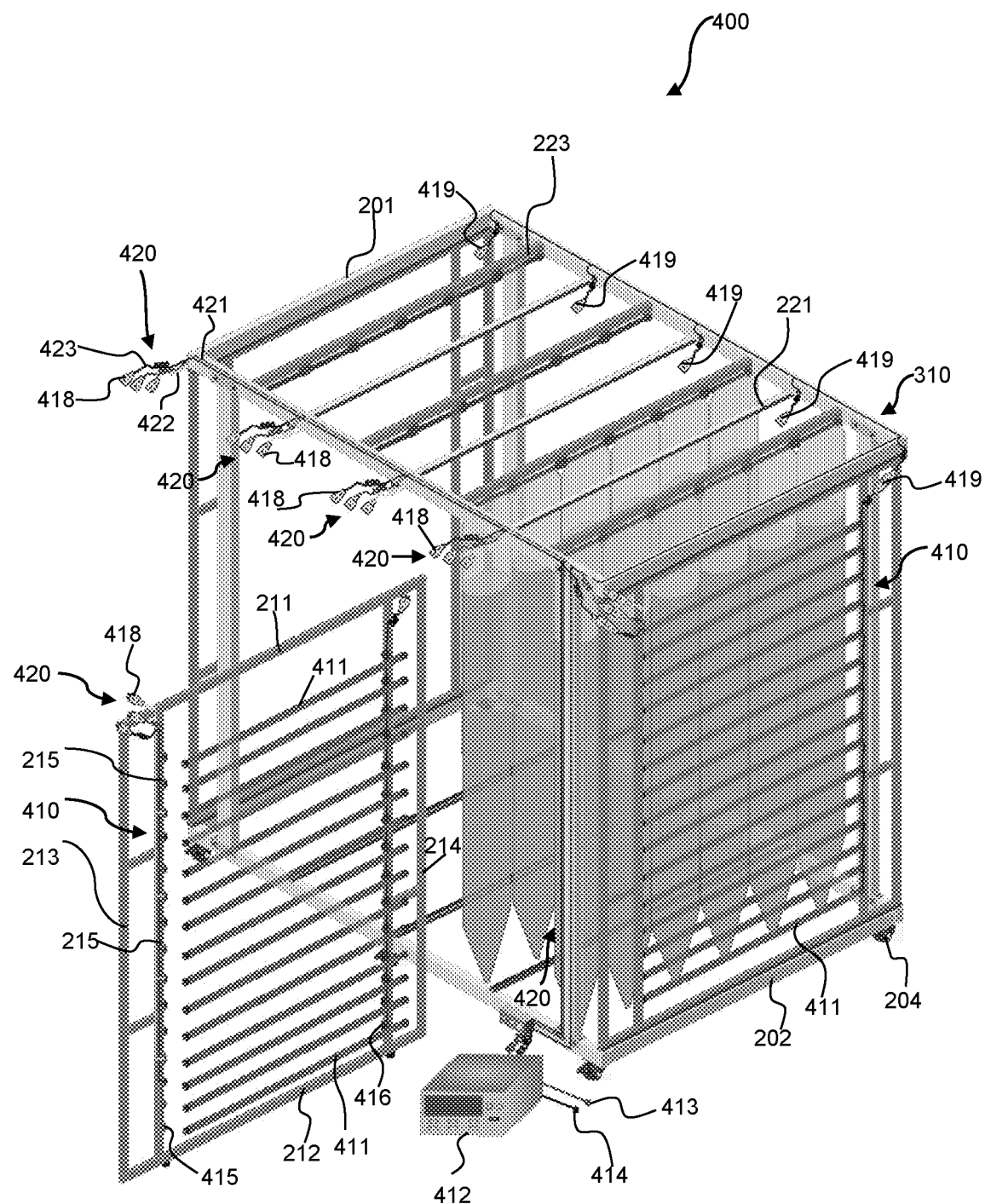
FIG. 4 shows the arrangement of the LED lights and electrical wiring unit of the green microalga farming assembly in accordance with an exemplary embodiment of the present invention.

Next referring to FIG. 4, a perspective diagram 400 showing an arrangement of array of LEDs 410 of the green microalga (*H. pluvialis*) farming assembly in accordance with an exemplary embodiment of the present invention is illustrated. Array of LEDs 410 includes a power supply and regulator 412 having a positive power supply output 413 and a negative power supply output 414. Inner side bars 215-216, top rectangular frame 201, and columns 203 are hollow and contains electrical wiring bundle 420 that includes a positive electrical wire 421, a negative electrical wire 422, and a ground wire 423. All electrical wires 421-423 are electrically coupled to male connectors 418 and female connectors 419 at both ends. Male connectors 418 and female connectors 419 are two pin clear insulating sleeve wire tube made of polyvinyl chloride (PVC). Negative power supply output 422 is electrically coupled to negative electrical wire 422, positive power supply output 403 is to positive electrical wire 423. Array of LEDs 410 is connected parallel to one another and adjacent to array of cultivation pouches 310. As such, each LED support subunit 220 contains an array of LED lights 410. Inner side bars 215-216 are hollow that contains electrical wiring bundle 420 connected to a series of electrical connectors 415 and 416. Each LED light 411 is electrically connected to a pair of electrical connectors 415-416 respectively. Within the scope of the present invention, each array of LEDs 410 contains a plurality of individual LED 411, each is selected at frequencies (colors) suitable for the growth of green microalgae (H. pluvialis). In some particular embodiments, LED light 411 is selected for the growth of keto-carotenoids at wavelengths of 442 nm to 472 nm, 24V with intensity 30 W to 130 W capable to varying the light intensity from 40 μmol photons/m2/s to 300 μmol photons/m2/s.

Figure 5:
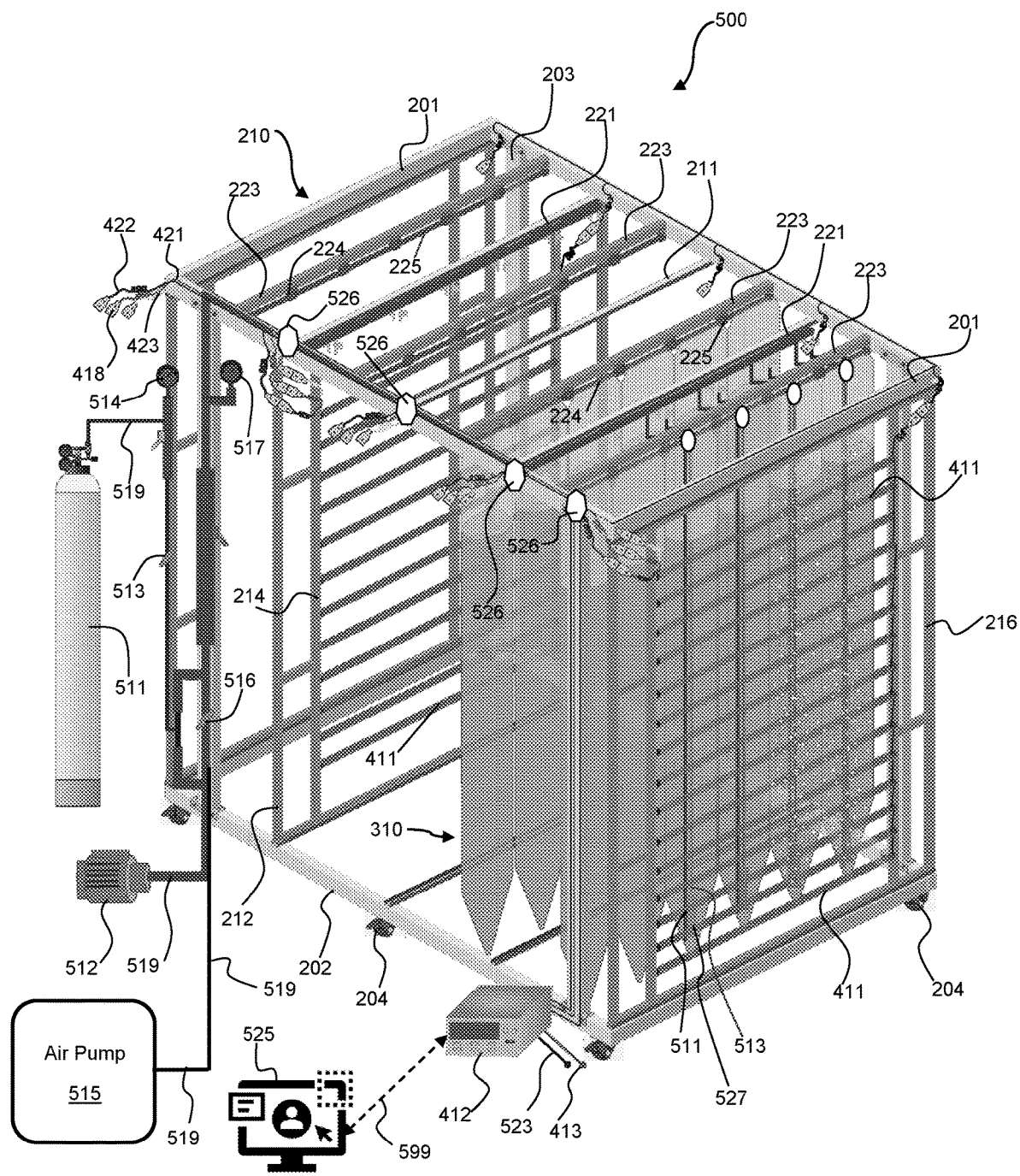
FIG. 5 shows the air and gas supply and distribution unit of the green microalga farming assembly in accordance with an exemplary embodiment of the present invention.

Next referring to FIG. 5, a perspective diagram 500 of air and gas supply and distribution unit 510 (air and gas unit 510) of farming assembly 100 in accordance with an exemplary embodiment of the present invention is illustrated. Air and gas 510 includes a carbon dioxide ($CO_2$) gas source 511, a gas pump 512, and an air pump 513. $CO_2$ gas is administered to each cultivation pouch 600 in array of cultivation pouches 310 by a network of fluid tubes 519 which is connected to a first valve 513 and air pump 512. In various aspects of the present invention, $CO_2$ gas source 511 can be obtained from direct air capture technology, biomass carbon removal storage (BiCRS), or from direct air capture technology.

Air pump 512 is designed to pump carbon dioxide ($CO_2$) to each cultivation pouch 600 by a fixed dose controlled by first valve 513. First valve 513 is a fluid metering device capable of delivering exact amount (dose) of $CO_2$ to each cultivation pouch 600. A gas meter 514 is used to monitor the exact dose of $CO_2$ delivered to each cultivation pouch 600. In some other embodiments of the present invention, gas pump 512 and first valve 513 are combined into one booster pump. An air pump 515 delivers an exact amount of oxygen to each cultivation pouch 311 by network of fluid tubes 513 that are connected to a second valve 516 and an air meter 517. Again, the exact amount of oxygen (dose) can be controlled by second valve 516 and air meter 517. Similarly, air pump 515 and second valve 517 can be combined into one booster pump. Booster pumps are pump that receives an input gas (either $CO_2$ or oxygen) and delivers an exact amount of air or gas at a given pressure. Network of fluid tubes 519 is coupled to and supported by support frame 200. Network of fluid tubes 519 leans against outer side bars 213 and bent along the length of top rectangular frame 201 to reach every single array of cultivation pouch 310. The operations of gas pump 512, first valve 513, air pump 515, and second valve 517 are controlled by computer 520. In many embodiments of the present invention, gas pump 512 and air pump 513 are electrical solenoid valves which can be controlled by computer 520.

Continuing with FIG. 5, diagram 500 also illustrates monitoring and controlling unit 520 (computer 520). Computer 520 includes a series of light sensors 526 located along the length of top rectangular frame 201 near each array of LED lights 310 and a series of temperature sensor and/or other sensors 527 (sensors 527) submerged inside each cultivation pouch 311. A computer 525 communicates to control signal generator 412 and light sensors 526, temperature and/or other sensors 527 via either electrical wires or wireless channels 599. In many embodiments of the present invention, wireless channels are wireless short-range communication channels, and long range wireless communication channels. Wireless short range communication channels include ZigBee™/IEEE 802.15.4, Bluetooth™, Z-wave, NFC, Wi-fi/802.11, cellular (e.g., GSM, GPRS, WCDMA, HSPA, and LTE, etc.), IEEE 802.15.4, IEEE 802.22, ISA100a, wireless USB, and Infrared (IR), LoRa devices, etc. Medium range wireless communication channels in this embodiment of communication link 599 include Wi-fi and Hotspot. Light sensors 526 are either diffuse reflective photoelectric type or through beam type (E-MSMT81P-2M). Temperature and/or other sensors 527 include pressure sensors, temperature sensors, and $CO_2$ gas sensors. Pressure sensors are resistive force sensors. $CO_2$ gas sensors are photoacoustic sensors. Temperature sensors are digital sensors that use diodes. These sensors—pressure, $CO_2$ gas, and temperature—are available in the market and need not be discussed in details here.

Figure 6:
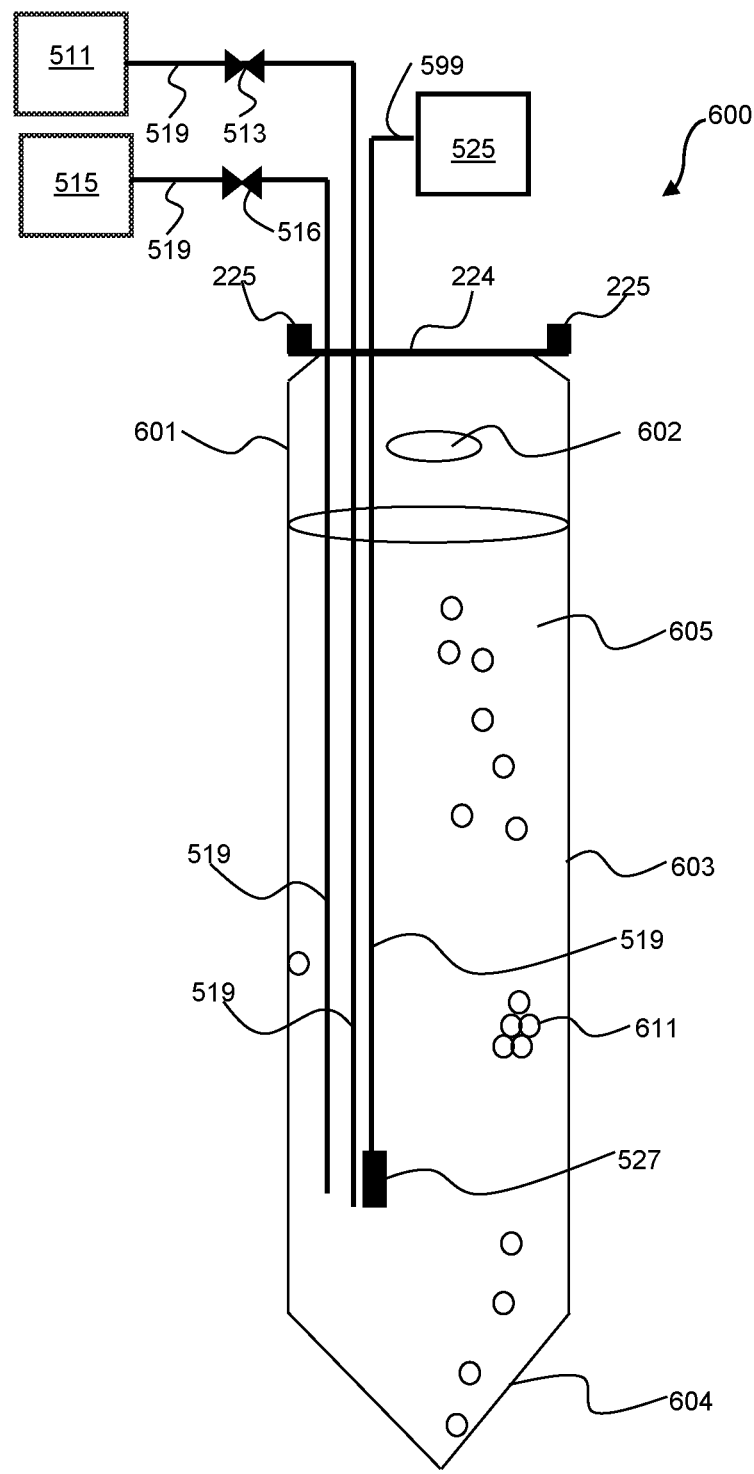
FIG. 6 shows a 2D perspective diagram of a cultivation pouch in accordance with an exemplary embodiment of the present invention.

Now referring to FIG. 6, a 2D perspective diagram representing cultivation pouch 600 in accordance with an exemplary embodiment of the present invention is illustrated. As alluded above, each cultivation pouch 600 has a top portion 601, a breather hole 602, a body portion 603, a bottom portion 604. Bottom portion 604 has a taper shape while top portion 601 and body portion 603 have an even columnar shape. Top portion 601 is sealed by clip line 224 and suspended by hangers 225 to pouch supporting bar 223. This way, fluid tubes 519 with a stone head 518 with sufficient pressure can create a vortex of an air circulation 621 from bottom portion 604 upward, creating a perfect habitat for green microalgae (H. pluvialis) 611 to grow. Temperature and/or other sensors 527 is submerged in cultivation pouch 600. Cultivation pouch 600 contains a substrate 605 conducive to the proliferation and accumulation of green microalgae (H. pluvialis) 611. In many preferred embodiments of the present invention, substrate 605 is an Optimal Haematococcus Medium (OHM) that includes the following ingredients per liter: 0.41 g $KNO_3$; 0.03 g $Na_2HPO_4$; 0.246 g $MgSO_4 \cdot 7H_2O$; 0.11 g $CaCl_2 \cdot 2H_2O$; 2.62 mg $FeC_6H_5O_7$; 0.011 mg $CoCl_2$; 0.012 mg $CuSO_4$; 0.075 mg $Cr_2O_3$; 0.98 mg $MnCl_2$; 0.12 mg $Na_2MoO_4$; 0.005 mg $SeO_2$; 25 μg biotin; 17.5 μg thiamine; and 15 μg vitamin $B_{12}$.

In operation, after farming assembly 100 is constructed as described above in FIG. 1 to FIG. 6, a selected H. pluvialis strain is transferred from agar plates to OHM 605 inside each cultivation pouch 600. Array of LEDs 310 are switched on to a preselected intensities. These intensities will change as green microalgae (H. pluvialis) proliferates $CO_2$ gas and air are pumped into each cultivation pouch 600 at preselected dose and pressure by means of air and gas unit 510 via respective gas valves 513 and air valves 516. Computer 520 observes these preselect conditions and makes adjustments to obtain optimal living conditions for each colony of green microalgae (H. pluvialis) 611. In many embodiments of the present invention, operation information from each cultivation pouch 600 in array of cultivation pouches 310 are networked and shared with other farming assemblies 100 in different geographical locations. This network arrangement achieves efficiency, useful information that reduces errors, infections, and achieves industrial production scale. The detailed methods of construction, culturing, harvesting with all preselected conditions are described in FIG. 7 to FIG. 14.

Figure 7:
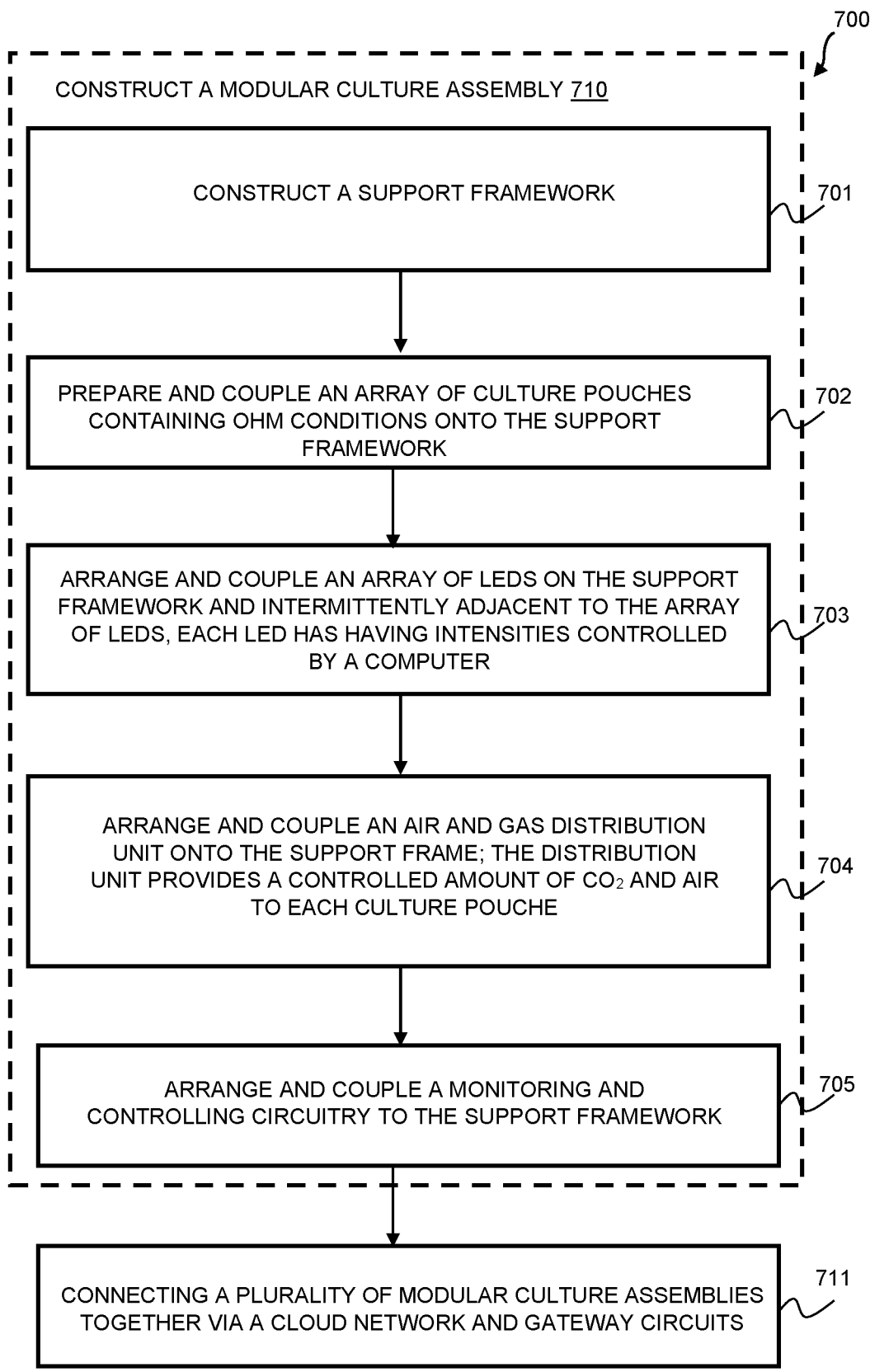
FIG. 7 shows a flow chart of a method for constructing a green-microalgae (*H. pluvialis*) farming assembly that provides high astaxanthin yield in accordance with an exemplary aspect of the present invention.

Next referring to FIG. 7, a flow chart of a method 700 for constructing a farming assembly that supports the farming and harvesting of green microalgae (H. pluvialis) in accordance with an aspect of the present invention is illustrated. Method 700 further includes a process 710 for constructing a single modular farming assembly 100 as described above and a process 711 for networking a plurality of culture assemblies located in different geographical locations. Modularity of farming assembly 100 enables a plurality of farming assemblies 100 to combine into a larger farming assembly at higher green microalgae output production.

At step 701, a mechanical support framework is constructed. Step 701 is realized by support framework 200 as described in FIG. 2 and FIG. 3. Supporting framework 200 further includes a main housing subunit 210 and a LED support subunit 220.

Next, at step 702, an array of cultivation pouches or chambers is constructed and coupled to the mechanical support framework. Step 702 is realized by array of cultivation pouches 310 as described in FIG. 2 and FIG. 3 above. Array of cultivation pouches 310 further contains a plurality of cultivation pouches 600 arranged next to one another. Array of cultivation pouches 310 is supported by pouch supporting bar 223 of support frame 200. Each pouch supporting bar 223 contains row of six cultivation pouches 600. Pouch supporting bars 223 are arranged parallel to each other and interspersed by top sliding tracks 221 also arranged in parallel to one another. It can be seen that cultivation pouches 600 is arranged in rows and columns as shown in FIG. 4. The structure and content of each cultivation pouch 600 is described above in FIG. 6.

At step 703, an array of LEDs and electrical wiring (array of LEDs) is formed and mechanically coupled to the support framework. Step 703 is realized by array of LEDs and electrical wiring unit (array of LEDs) 410. Array of LEDs 410 is coupled to top slider bars 221 of support frame 200. Array of LEDs 410 is arranged in between array of cultivation pouches 310 so that LED lights can reach green microalgae (*H. pluvialis*) 611 inside each cultivation pouch 600. Please refer to FIG. 4-FIG. 5 for more detailed realization of step 703.

At step 704, an air and gas supply and distribution unit (air and gas distribution) is provided and coupled to the support framework. Step 704 is realized by air and gas distribution unit 510 (air and gas unit 510) as described in FIG. 4 and FIG. 5 above. The object of step 704 is to regulate the exact amount of $CO_2$ and air to each cultivation pouch 600. Air and gas unit 510 of step 704 is coupled to and supported by support frame 200.

At step 705, a monitoring and controlling unit (computer) is provided and coupled to the support framework. Step 705 is realized by monitoring and controlling unit 520 (computer 520) as described in FIG. 5. Light sensors 526 and temperature and/or other sensors 527 send back signals reflecting habitat conditions of green microalgae (*H. pluvialis*) 611 inside each cultivation pouch 600 to computer 525. In various aspects of the present invention, computer 525 is programmed to communicate to and control light sensors 526 and temperature and/or other sensors 527 via communication link 599.

After step 705, a single, modular, and independent farming assembly 100 is constructed that is designed to carry methods of the present invention for culturing green microalgae (*H. pluvialis*) and for harvesting at high efficiency.

Next at step 711, a plurality of culture assembly built by steps 701-705 above are connected together by either networking and/or cloud networking. The detailed realization of step 706 is disclosed later in FIG. 12-FIG. 14. It is noted that different structures, configurations, steps can be used to realize steps 701-706 that produce either the same or obvious variations of farming assembly 100 described above in FIG. 1-FIG. 6 are within the scope of the present invention.

Figure 8:
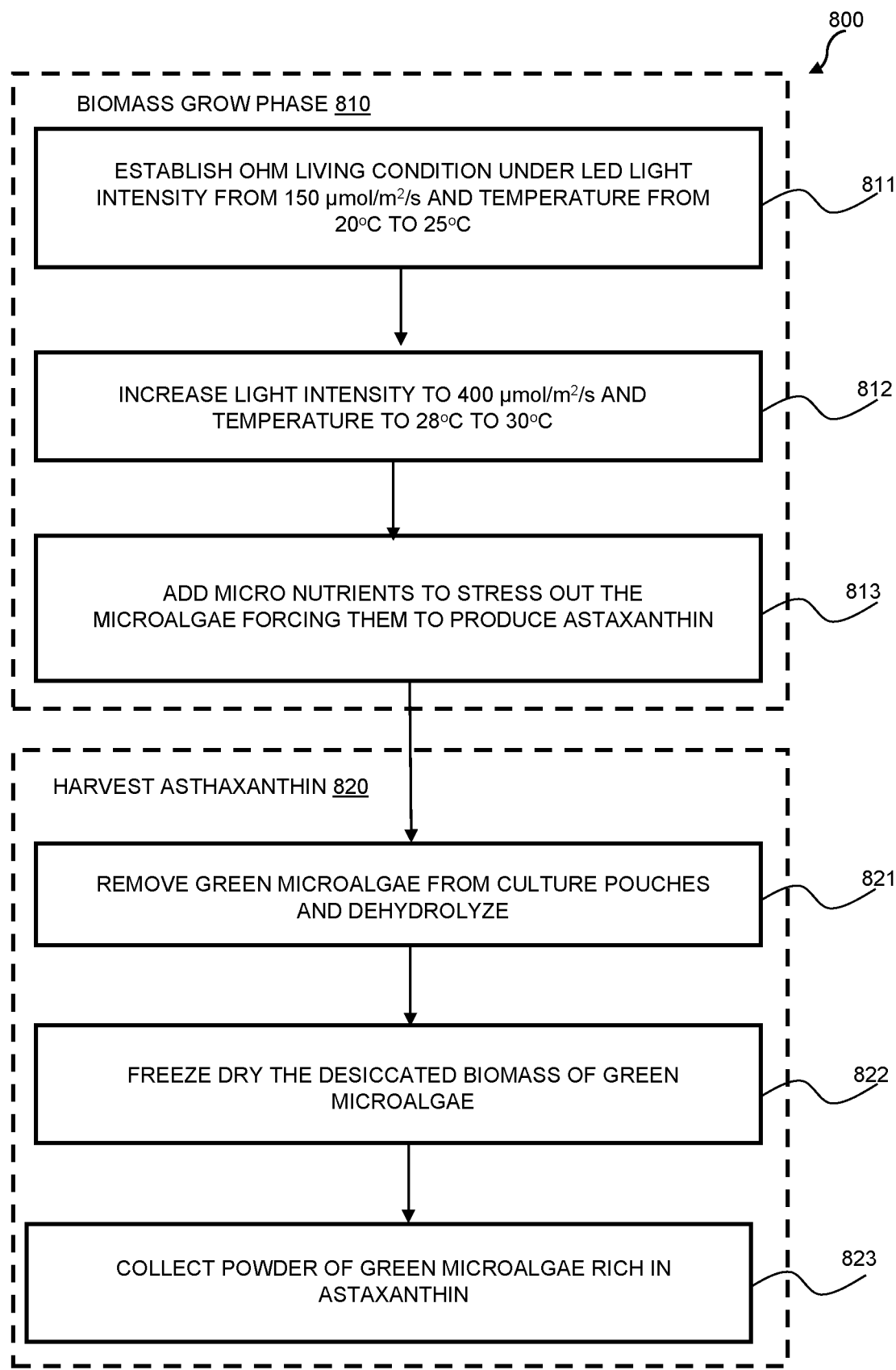
FIG. 8 shows a flow chart of a process for growing green microalgae with high astaxanthin yield in accordance with an exemplary aspect of the present invention.

Next, referring to FIG. 8, a flow chart of a process 800 for cultivating green microalgae (*H. pluvialis*) and harvesting astaxanthin (keto-carotenoid) in according to an exemplary aspect of the present invention is illustrated and discussed.

After farming assembly 100 is constructed, process 800 of the present invention is performed to cultivate green microalgae (*H. pluvialis*) and harvest astaxanthin. Process 800 is comprised of a biomass growth phase 810 and an astaxanthin collection (harvest) phase 820. In biomass growth phase 810, green microalgae are allowed to proliferate in an acclimation phase, two continuous proliferation phases, and to encyst in an accumulation stage. In an acclimation phase, green microalgae (*H. pluvialis*) are allowed to acclimate to the OHM. In a first proliferation phase, the predetermined conditions are varied to cause cycle of unfavorable culture conditions and optimal culture are introduced to cause the green microalgae (*H. pluvialis*) to proliferate to $1.10^5$ cells/ml-$3.10^5$ cells/ml. In a second proliferation phase, green microalgae (*H. pluvialis*) is subject to further proliferate to $10^7$ cells/ml-$5.10^8$ cells/ml. In the accumulation stage, unfavorable conditions are introduced to change cellular morphologies from the green vegetative motile stage (macrozooids, microzooid, and pamella) to red vegetative non-motile haematocyst (aplanospores). In collection phase, the green microalgae (*H. pluvialis*) are removed and astaxanthin is harvested.

At step 811, the biomass of the green microalgae (*Haematococcus Pluvialis*) is acclimated and proliferated. Step 811 is realized by first preparing an optimal *Haematococcus* medium (OHM). In many preferred aspects of the present invention, OHM is consisted of: 0.41 g $KNO_3$; 0.03 g $Na_2HPO_4$; 0.246 g $MgSO_4 \cdot 7H_2O$; 0.11 g $CaCl_2 \cdot 2H_2O$; 2.62 mg $FeC_6H_5O_7$; 0.011 mg $CoCl_2$; 0.012 mg $CuSO_4$; 0.075 mg $Cr_2O_3$; 0.98 mg $MnCl_2$; 0.12 mg $Na_2MoO_4$; 0.005 mg $SeO_2$; 25 µg biotin; 17.5 µg thiamine; and 15 µg vitamin $B_{12}$. Furthermore, step 811 is realized by sub-steps:

Continued with step 811, the acclimation and proliferation of green the microalgae (*H. pluvialis*) is introduced to a first predetermined vegetative condition. In the first predetermined conditions, the microalgae (*H. pluvialis*) is introduced to the OHM and allowed to acclimate to the medium. The light intensity slowly increases from 40 µmol photons/m2/s to 50 µmol photons/$m^2$/s for 5 to 7 days. No carbon dioxide ($CO_2$) is supplied and aeration (the supply of air) is supplied with a flow rate of 100 ml/min. Microalgae (*H. pluvialis*) proliferate slowly to $1.10^5$ cells/m. The proliferation rate in step 811 is 10%.

At step 812, a first proliferation phase is performed. The first proliferation phase is specified by a second predetermined vegetative condition, in which: OHM increasing the temperature inside each cultivation pouch 600 at 20° C.-25° C. and continuously illuminating with a predetermined light intensity of 150 µmol photons/$m^2$/s. In second predetermined vegetative conditions, $CO_2$ gas is still not introduced and aeration is continued so that the microalgae (*H. pluvialis*) proliferate to $1.10^5$ cells/ml-$3.10^5$ cells/ml. Inside each cultivation pouch 600, the green microalgae (*H. pluvialis*) acts as phytoremediation agent which absorbs nutrients including pollutants such as carbon dioxide ($CO_2$) and produces biomass with high value compounds such as astaxanthin.

At step 813, a second proliferation phase is performed. Step 813 is realized by varying the second predetermined condition to a third predetermined vegetative condition. In step, $CO_2$ is added for 14 days and other conditional factors stay the same. As discussed above, carbon dioxide ($CO_2$) source can be obtained from carbon dioxide source 511 such as direct air capture technology, biomass carbon removal storage (BiCRS), or from direct air capture technology. The green microalgae (*H. pluvialis*) proliferates to $10^7$ cells/ml-$5.10^8$ cells/ml. More specifically, the $CO_2$ gas is started with a flow rate from 1 mg/l/min to 5 mg/l/min, air is supplied at a flow rate of 2.5 liters/minute to 4 liters/minute to provide nutrition and proliferation for the green microalga (*H. pluvialis*). Air flows at the rate of 2.5 liters/minute to 4 liters/minute to stir the green microalgae (*H. pluvialis*) at the bottom of cultivation pouch 600. As such, clogging of the green microalgae *H. pluvialis* is prevented. The biomass growth period ranges from 7 to 15 days.

At step 814, the accumulation phase is begun. Step 814 is realized by a fourth predetermined vegetative condition. In the fourth predetermined vegetative condition, adverse conditions are introduced to stress out the green microalgae (*H. pluvialis*) forcing them to produce more astaxanthin. The light intensity is increased to 300 µmol photons/m$^2$/s-400 µmol photons/m$^2$/s. Temperature are increased to 28° C.-30° C. Micronutrients such as sodium acetate ($C_2H_3NaO_2$), sodium chloride (NaCl) are added. The ratio of mass/volume of micronutrients added to the vegetative environment ranges from 0.5 g/l to 2.5 g/l. At this stage, air is continuously supplied into cultivation pouch 600 to aid in the accumulation astaxanthin with a flow rate of 2.5 liters/minute to 4 liters/minute. After a period of astaxanthin accumulation of about 10 to 15 days, the density of green microalga (*H. pluvialis*) 611 accumulating astaxanthin in each cultivation pouch 600 decreases to $10^6$ cells/ml-$5.10^7$ cells/ml. Please refer to FIG. 10C for reference.

In summary, from steps 811-814, green microalga (*H. pluvialis*) cells are subject to different predetermined vegetative conditions. When exposed to their favorable conditions, they grow into a characteristic green color with increase in biomass. However, when exposed to unfavorable environmental conditions in terms of nutrients, temperature, pH, light, etc., they change from green vegetative motile cells to red non-motile haemotocysts that accumulate astaxanthin.

Now, the harvest of astaxanthin phase 820 begins:

At step 821, biomass of green microalga (*H. pluvialis*) is collected by dehydration (removal of water) method. In some aspects of the present invention, water is removed by centrifugation or vacuum filtration. According to a specific aspect, after the green microalga (*H. pluvialis*) cells change from red nucleus to completely red. At this time, the green microalga (*H. pluvialis*) cells have accumulated rich astaxanthin content. They proceeds to obtain biomass. Specifically, medium 605 from array of cultivation pouches 310 is continuously pumped into the centrifugation device at a rate of 15,000 rpm until it runs out. The algal biomass after centrifugation is prepared for the algae freeze-drying process.

At step 822, the green microalgae biomass is freeze dried. Specifically, the green microalga (*H. pluvialis*) biomass after centrifugation is frozen at −20° C. for 48 hours. Then it is lyophilized at −5° C. and at 0.1 mBar pressure until the biomass is completely dried. Other drying methods include spray drying, or cryodesiccation.

At step 823, astaxanthin-rich green microalga powder (*H. pluvialis*) is collected. Step 823 is realized by storing the freeze dried biomass it in vacuum bags, avoiding light exposure and storing at −20° C. According to one aspect of the present invention, the mass of astaxanthin-rich green microalga (*H. pluvialis*) powder obtained at least 2.5 g/l; and astaxanthin content reaches at least 5%.

Continuing with step 823, green microalgae powder (*H. pluvialis*) rich in astaxanthin is extracted and astaxanthin is quantified. The extraction method is performed as follows: weigh the green microalga (*H. pluvialis*) powder into a tube, add 4M hydrochloric acid (HCl). The mixture is incubated at 70° C. for 5 minutes. The treated mixture is centrifuged at 12,000 rpm for 10 minutes at 4° C. The HCl acid solution is removed, washed twice with sterile distilled water. Then, the solution is centrifuged again to remove water. Green microalgae biomass is dissolved in 1 ml of 99% acetone solvent. The mixture is sonicated in a cold bath for 20 minutes, then centrifuged at 13,000 rpm/5 minutes at 4° C. The supernatant containing astaxanthin is collected. The extraction method with acetone solvent is repeated until the algae biomass completely lost its color. The final acetone extract is filtered through a 0.22 µM filter and prepared for HPLC-High Performance Liquid Chromatography analysis. Please refer to FIG. 11-FIG. 12.

The freeze-dried microalgal biomass sample is then extracted and determined astaxanthin content using HPLC high-performance liquid chromatography. In realization of step 823, samples were sent for analysis at the Ho Chi Minh City Laboratory Analysis Service Center. The standard substance (all-trans-astaxanthin) was mixed into many different concentrations, then these concentrations were analyzed by HPLC to determine the peak areas. From the peak areas of the standard concentrations, a standard curve equation of the form y=ax+b was, in which y is the peak area, x is the astaxanthin content. The green microalgae (*H. pluvialis*) powder sample was extracted with the acetone solvent mentioned above and the extract was analyzed by HPLC. The peak area results and the standard curve were used in the equation above to calculate the astaxanthin content in the extract of the green microalgae (*H. pluvialis*) powder.

Figure 9:
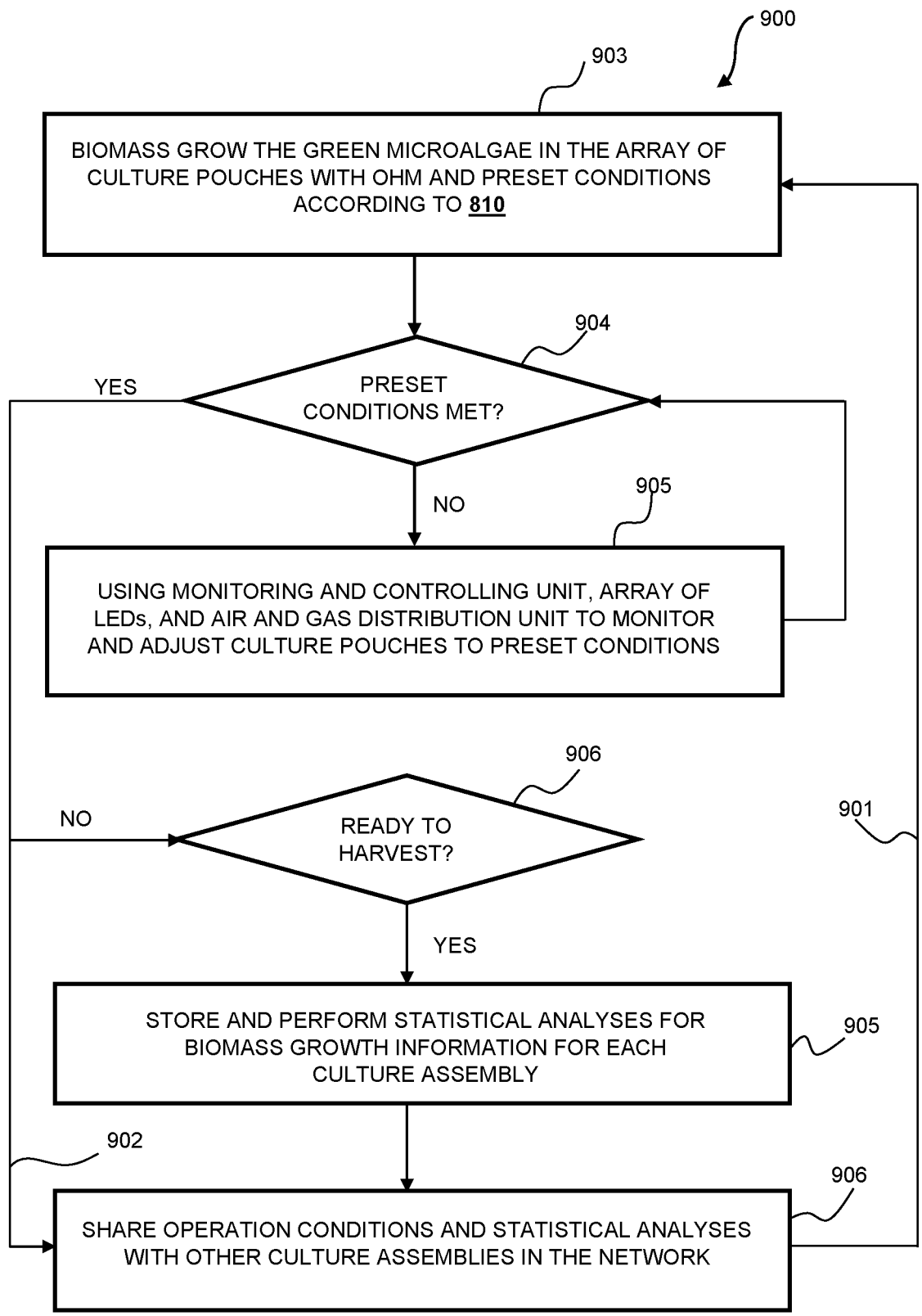
FIG. 9 shows a flow chart of a software application program for monitoring and controlling the cultivation of green microalgae with high astaxanthin yield in a network of farming assemblies in accordance with an exemplary aspect of the present invention.

Now referring to FIG. 9, a flow chart of a software program application 900 (process 900) for farming and harvesting green microalgae (*H. pluvialis*) in a network of culture assemblies described in FIG. 1-FIG. 6 in accordance with an exemplary aspect of the present invention is illustrated. Process 900 is stored in a non-transitory memory and executed by a central processing unit (CPU) (see FIG. 15 and FIG. 16). The objective of process 900 is to: (a) controlling the cultivation and harvesting processes of green microalgae in a network of farming assemblies 100, (b) sharing viable information to increase overall efficiency and growth rate, and (c) avoid errors and infections in farming assemblies 100.

At step 901, previous successful farming information is obtained. Step 901 is realized by light sensors 526 and temperature and other sensors 527 and computer 525 from each farming assembly 100 within the network (e.g. green algae farming network 1400). Successful farming information and experience are stored in storage device accessible to all computers 525 within the farming network.

Next, at step 902, previous failing farming information is also obtained and loaded into computers. Step 902 is realized by sensors light sensors 526, temperature and other sensors 527, and computer 525 from each farming assembly 100 within the network. As alluded before, every time any cultivation pouches 600 among array of cultivation pouches 310 within the network fails and/or encounters challenges, they are replaced by new cultivation pouch 600 and step 810 is performed again. These failed cultivation pouches 600 are analyzed and failure information is stored in computer 525 as useful guide for future development. The review of the successful and/or failed information serve as instruction information for future machine learning.

At step 903, a biomass growth process described in step 810 is performed. After obtaining successful and failure information, array of cultivation pouches 310 are prepared for biomass growth as described in step 810.

At step 904, temperature, pressure, air content, $CO_2$ content, and flow rate for each cultivation pouch 600 in array of cultivation pouches 310 are monitored and determined whether they follow the predetermined vegetative conditions. The predetermined vegetative conditions are disclosed in FIG. 8 above.

At step 905, when at least one cultivation pouch is failed and predetermined vegetative conditions change leading to low biomass count, those cultivation pouches within array of cultivation pouches 310 are replaced by new ones and step 903 repeats.

At step 906, when predetermined vegetative conditions are met and the green microalgae are ready for harvest, go to step 907.

Figure 15:
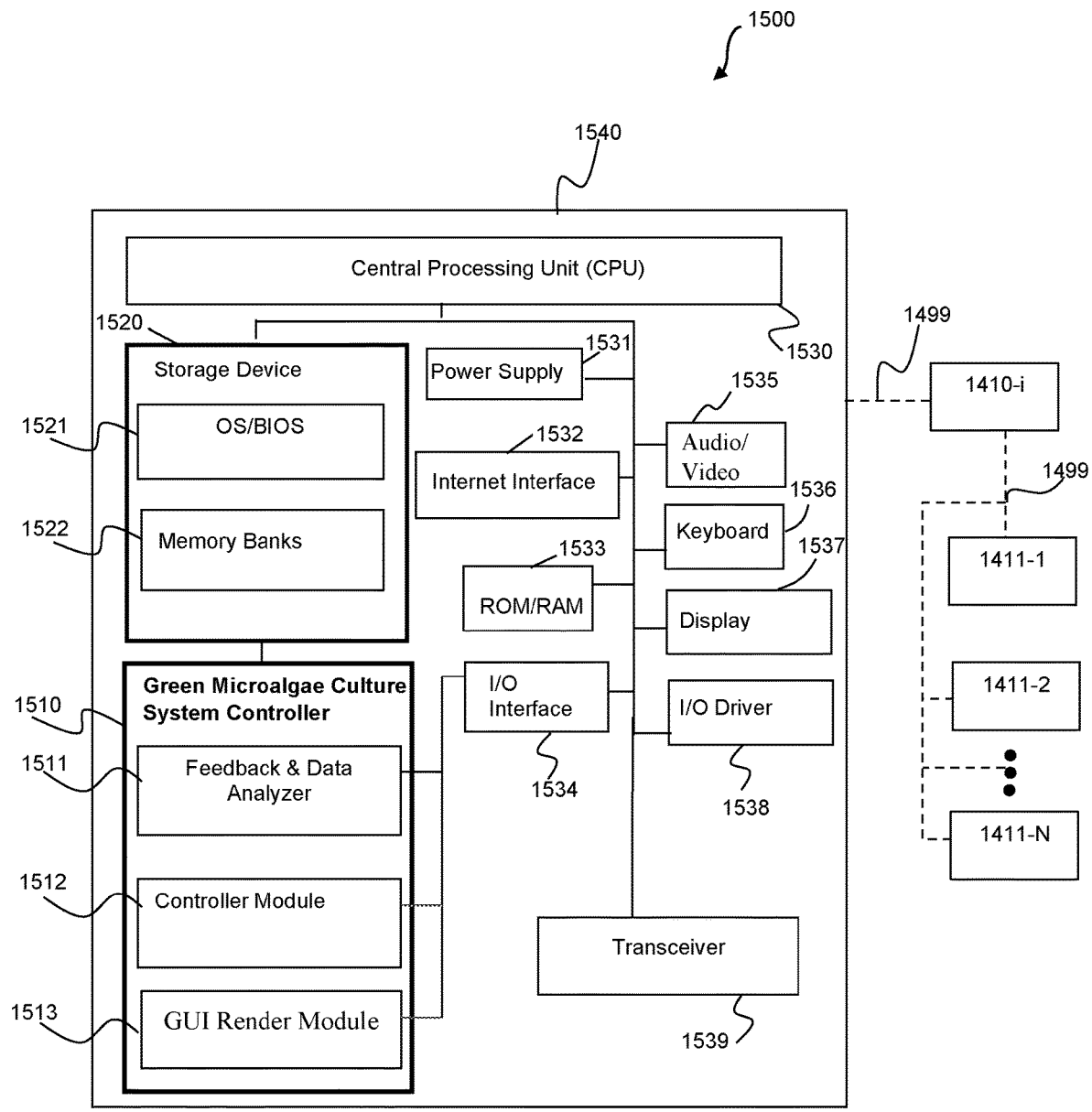
FIG. 15 shows a schematic diagram of one of a server computer loaded with a software application for monitoring and controlling the network of the green microalgae (*H. pluvialis*) farming assemblies in accordance with an exemplary embodiment of the present invention.
Figure 16:
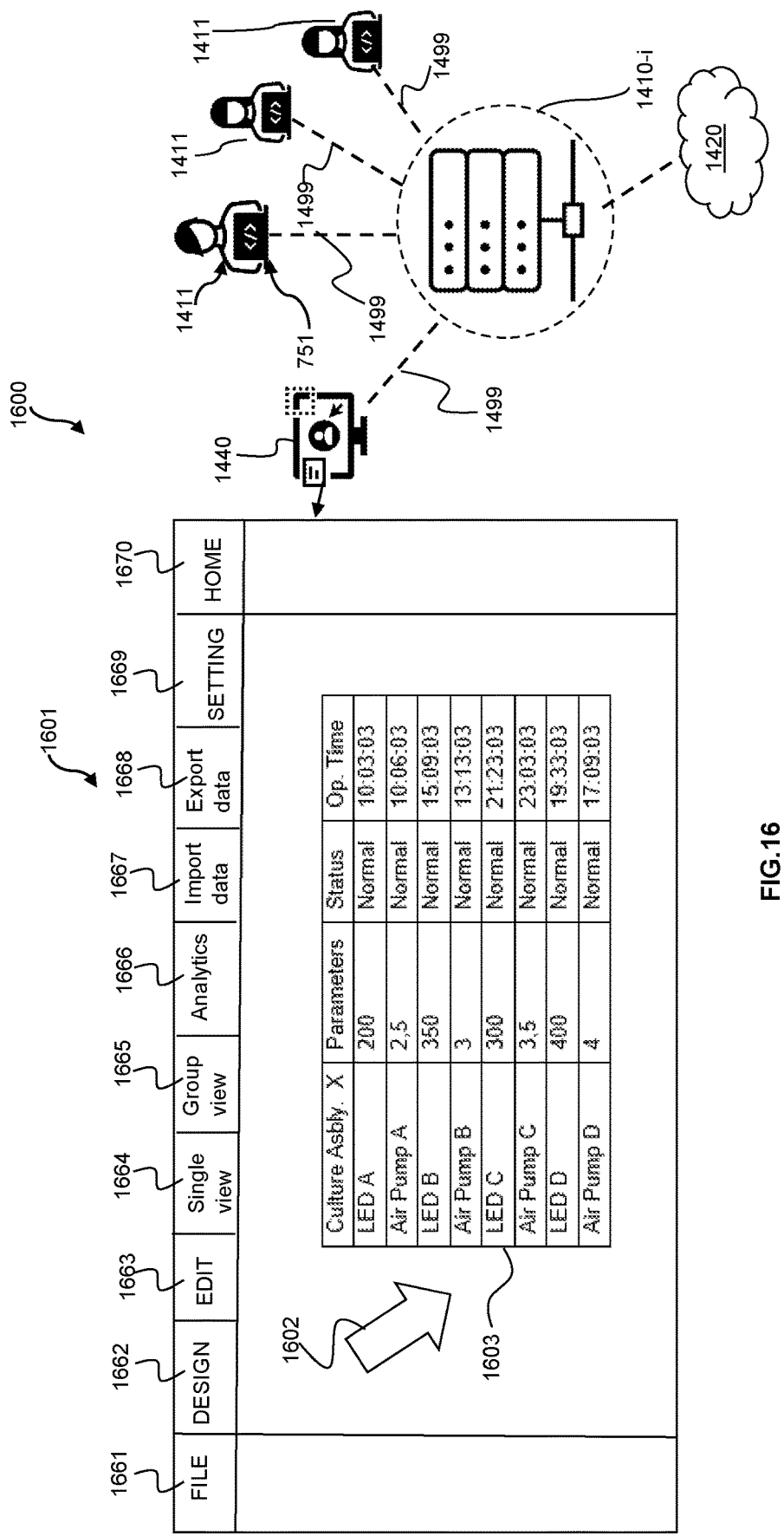
FIG. 16 shows a graphic user interface (GUI) of a monitor and control software application for the network of the green microalgae (*H. pluvialis*) culture assemblies in accordance with an exemplary embodiment of the present invention.

At step 907, failure and successes as well as locations of each cultivation pouch 600 are statistically analyzed and stored in memory storage (see FIG. 15 and FIG. 16). Statistical analyses including (but not limited to) means, standard deviations, analysis of variance (ANOVA), distribution functions for successes and failures are performed. These analytics and operation information help in the total production and overall efficiency of green microalgae farming.

Figure 14:
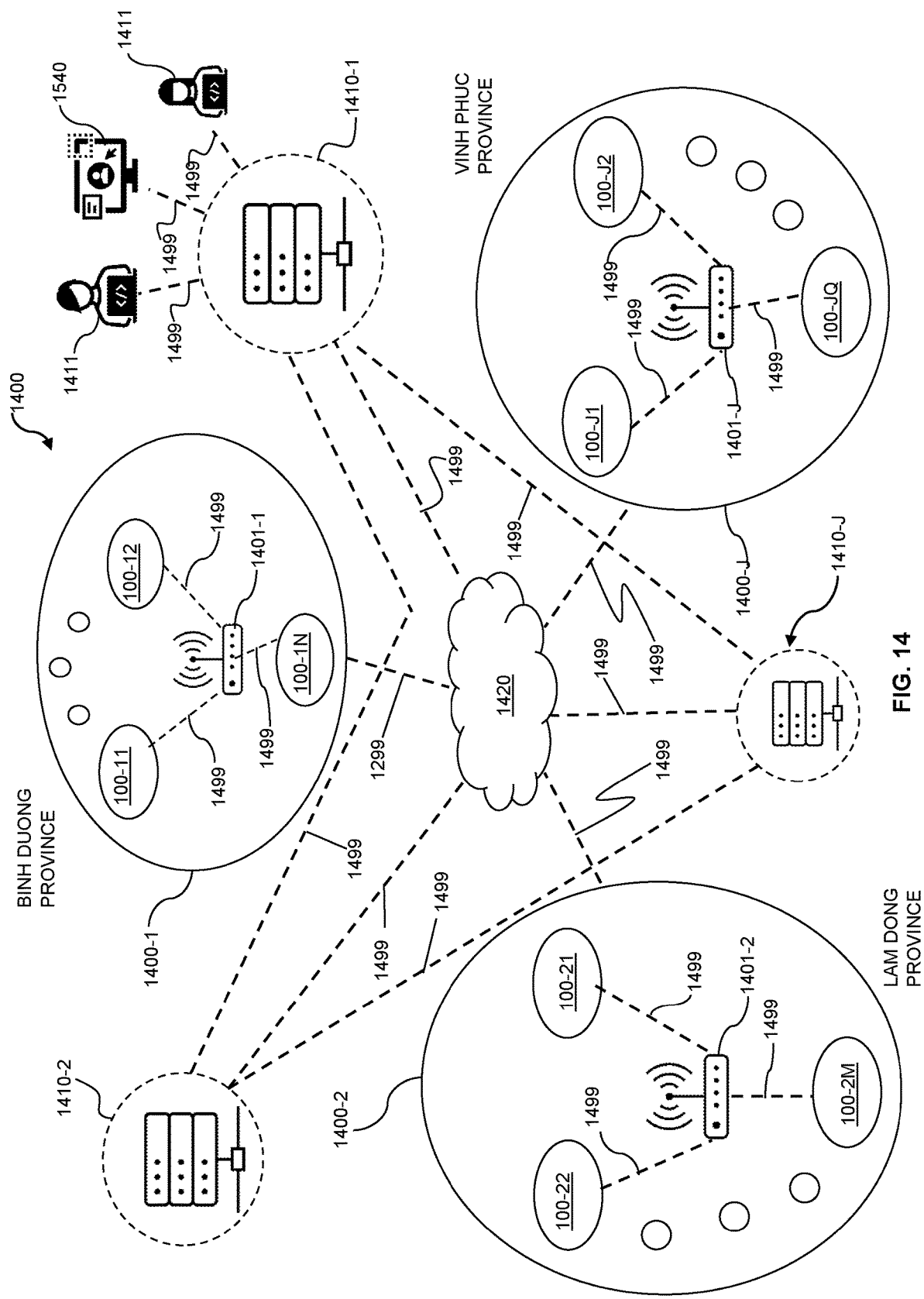
FIG. 14 shows a system level schematic diagram of a green microalgae farming network that connects green microalgae (*H. pluvialis*) farming assemblies together in accordance with an exemplary embodiment of the present invention.

At step 908, the statistical analyses and operation information are shared among cultivation pouches 600 within the network (please refer to FIG. 14-FIG. 16). Finally, when green microalgae (H. pluvialis) are ready to harvest, step 820 described above is performed.

Figures 10A, 10B, 10C:
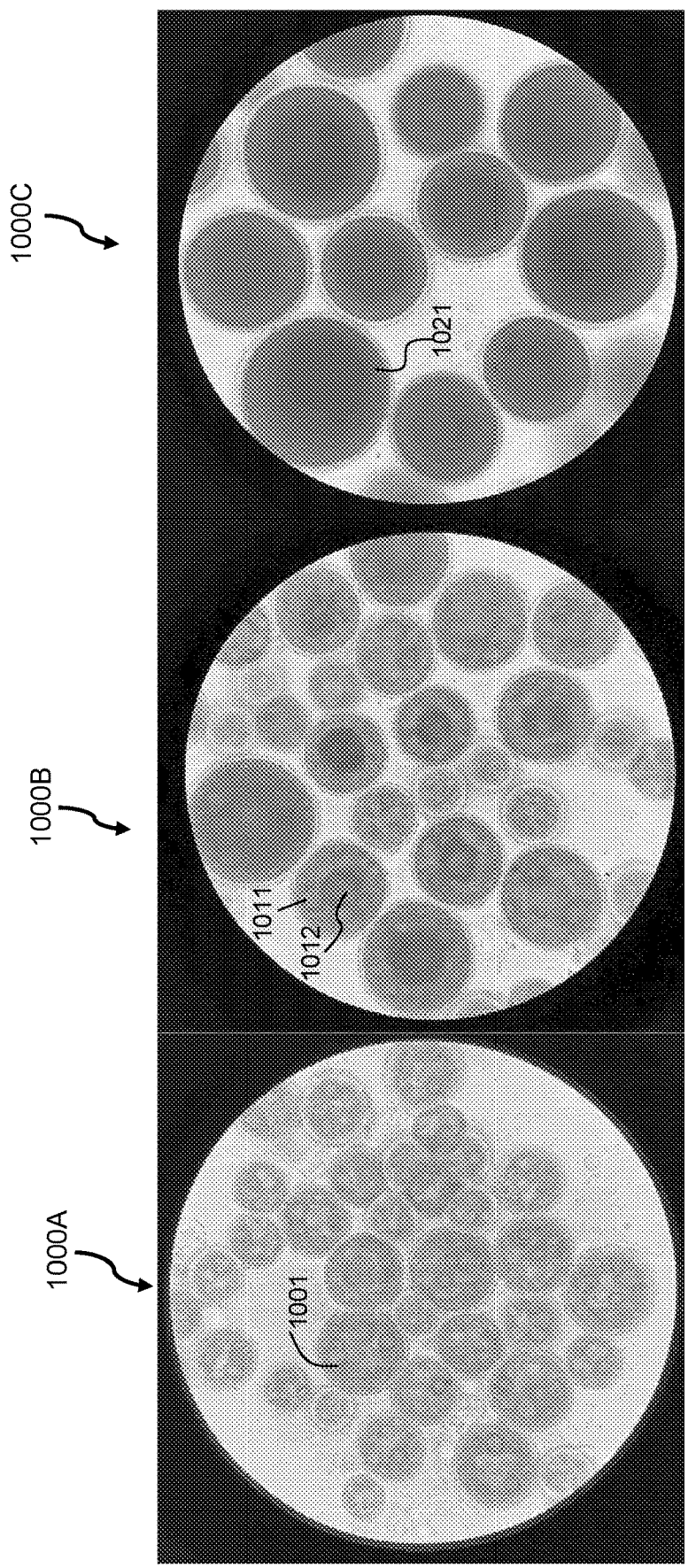
FIG. 10A-FIG. 10C show the morphology of the green microalgae cells at different stages—proliferation stage, late proliferation stage, and accumulation stage—under 100× magnification of an electron microscope.

FIG. 10A-FIG. 10C illustrate step 906 for determining whether green microalgae 611 in each cultivation pouch 600 is ready for harvest. In other words, FIG. 10A-FIG. 10C illustrate the cellular morphologies of green microalgae (H. pluvialis) from green vegetative motile stage to red non-motile haematocyst stage. According to FIG. 10A, in the proliferation stage with optimal conditions, the green microalga (H. pluvialis) 1001 cells are green vegetative motile stage and divide into many nearly circular cells. Normally after about 10 days of culture, according to FIG. 10B, the green microalgae cell (H. pluvialis) 1011 encloses a red nucleus 1012 in the middle. At this time the green microalgae cell (H. pluvialis) is at the end of the growth phase. The nutrient medium begins to exhaust. Therefore, after the astaxanthin accumulation period, green microalgae (H. pluvialis) cells 1021 grow larger and reach red non-motile haematocyst stage as shown in FIG. 10C. This is a sign of the end of the astaxanthin accumulation phase. The extraction of astaxanthin-rich in green microalgae (H. pluvialis) begins.

Figure 11:
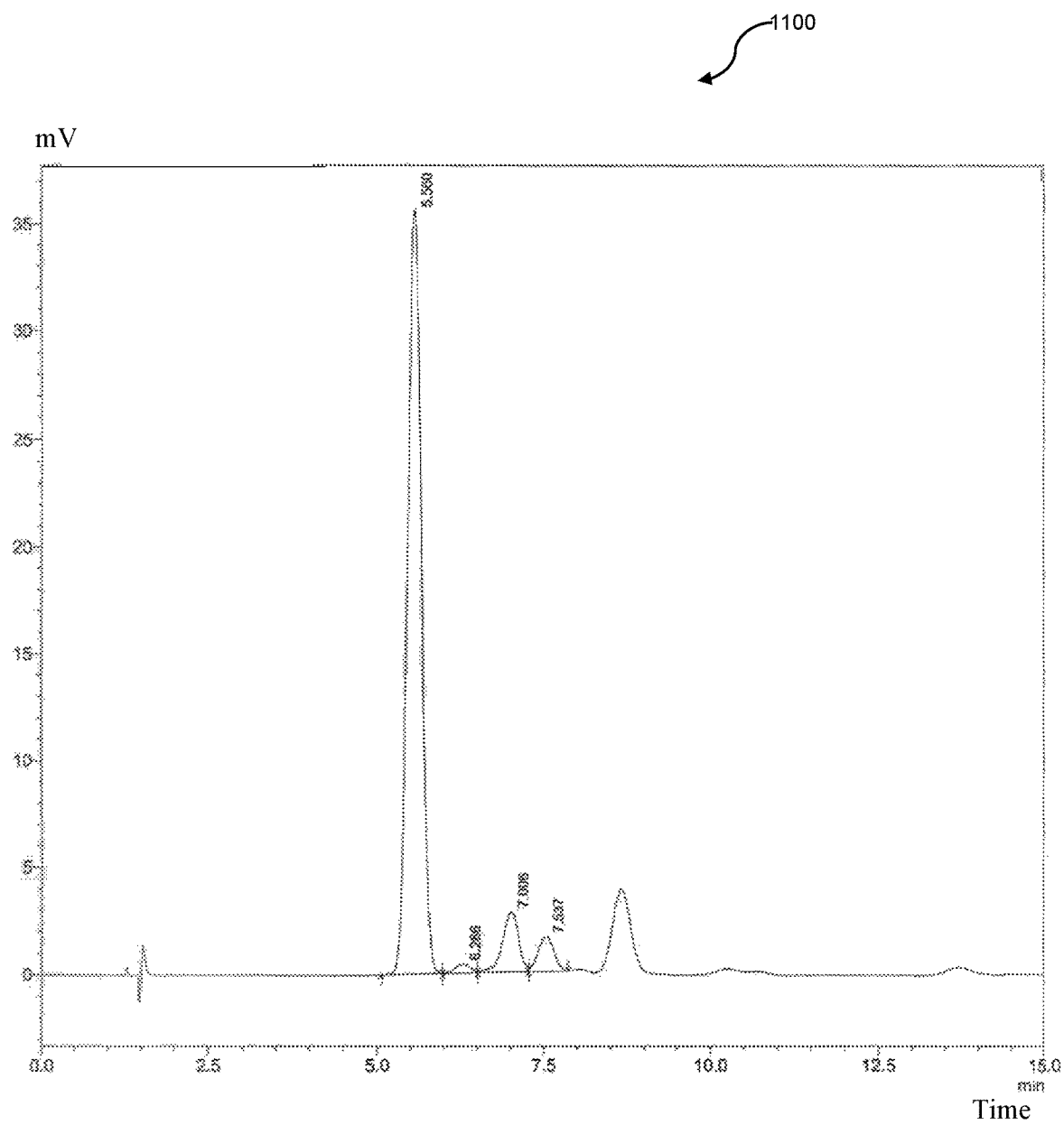
FIG. 11 presents the HPLC-High Performance Liquid Chromatography (HPLC-High Performance Liquid Chromatography) chart of green microalgae (*H. pluvialis*) powder with the astaxanthin content of 5.09% raised from the green microalgae farming assembly of the present invention.

According to FIG. 11, a HPLC high-performance liquid chromatography chart 1100 of an extract sample from green microalgae (H. pluvialis) powder is illustrated. Based on the HPLC high performance liquid chromatography chart 1100 and Table 1, the astaxanthin content in green microalgae (H. pluvialis) powder extract is calculated to be 5.09%.

TABLE 1

The Peak Information and Area of the Sample Extracted from Green Microalgae (H. Pluvialis) Powder with Astaxanthin Content of 5.09%.

| No. | Peak | Area | Height | Area (%) | Height (%) |
|---|---|---|---|---|---|
| 1 | 5.56 | 513690 | 35657 | 86.273 | 88.116 |
| 2 | 6.286 | 6719 | 415 | 1.128 | 1.025 |

TABLE 1-continued

The Peak Information and Area of the Sample Extracted from Green Microalgae (H. Pluvialis) Powder with Astaxanthin Content of 5.09%.

| No. | Peak | Area | Height | Area (%) | Height (%) |
|---|---|---|---|---|---|
| 3 | 7.006 | 48293 | 2788 | 8.111 | 6.891 |
| 4 | 7.537 | 26723 | 1606 | 4.488 | 3.968 |
| Total | | 595424 | 40466 | 100 | 100 |

Figure 12:
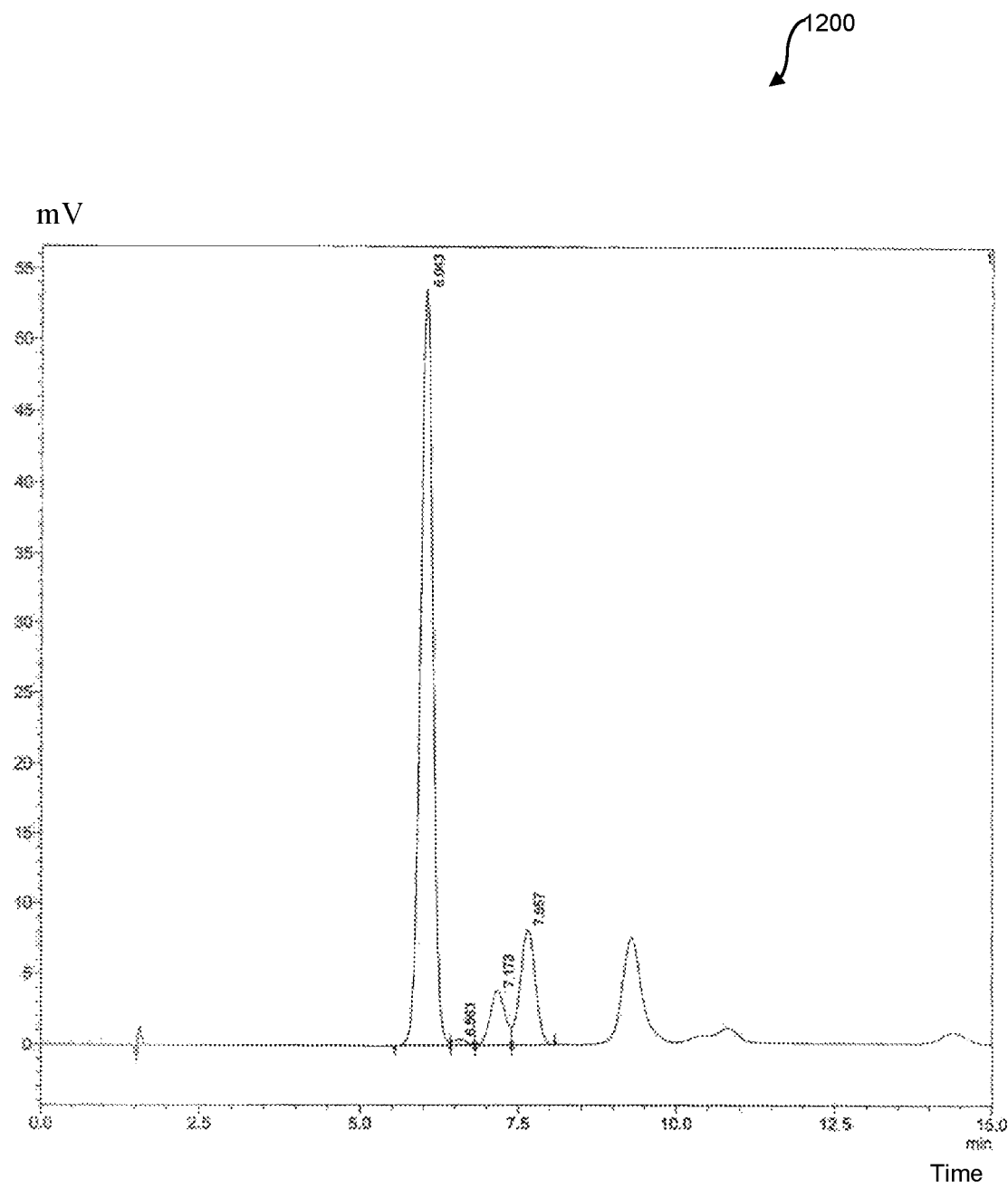
FIG. 12 shows the HPLC high-performance liquid chromatography chart of green microalgae (*H. pluvialis*) powder with the astaxanthin content of 7.92% raised from the green microalgae farming assembly of the present invention.

According to FIG. 12, a HPLC high-performance liquid chromatography chart 1200 of an extract sample from green microalgae (H. pluvialis) powder is illustrated. Based on the HPLC high performance liquid chromatography chart 1100 and Table 2, the astaxanthin content in green microalgae (H. pluvialis) powder extract is calculated to be 7.92%.

TABLE 2

The Peak Information and Area of the Sample Extracted from Green Microalgae (H. Pluvialis) Powder with Astaxanthin Content of 7.92%.

| No. | Peak | Area | Height | Area (%) | Height (%) |
|---|---|---|---|---|---|
| 1 | 6.043 | 741448 | 53643 | 78.272 | 81.155 |
| 2 | 6.563 | 6079 | 422 | 0.642 | 0.639 |
| 3 | 7.173 | 63515 | 3860 | 6.705 | 5.84 |
| 4 | 7.657 | 136232 | 8174 | 14.382 | 12.366 |
| Total | | 947275 | 66099 | 100 | 100 |

Figure 13:
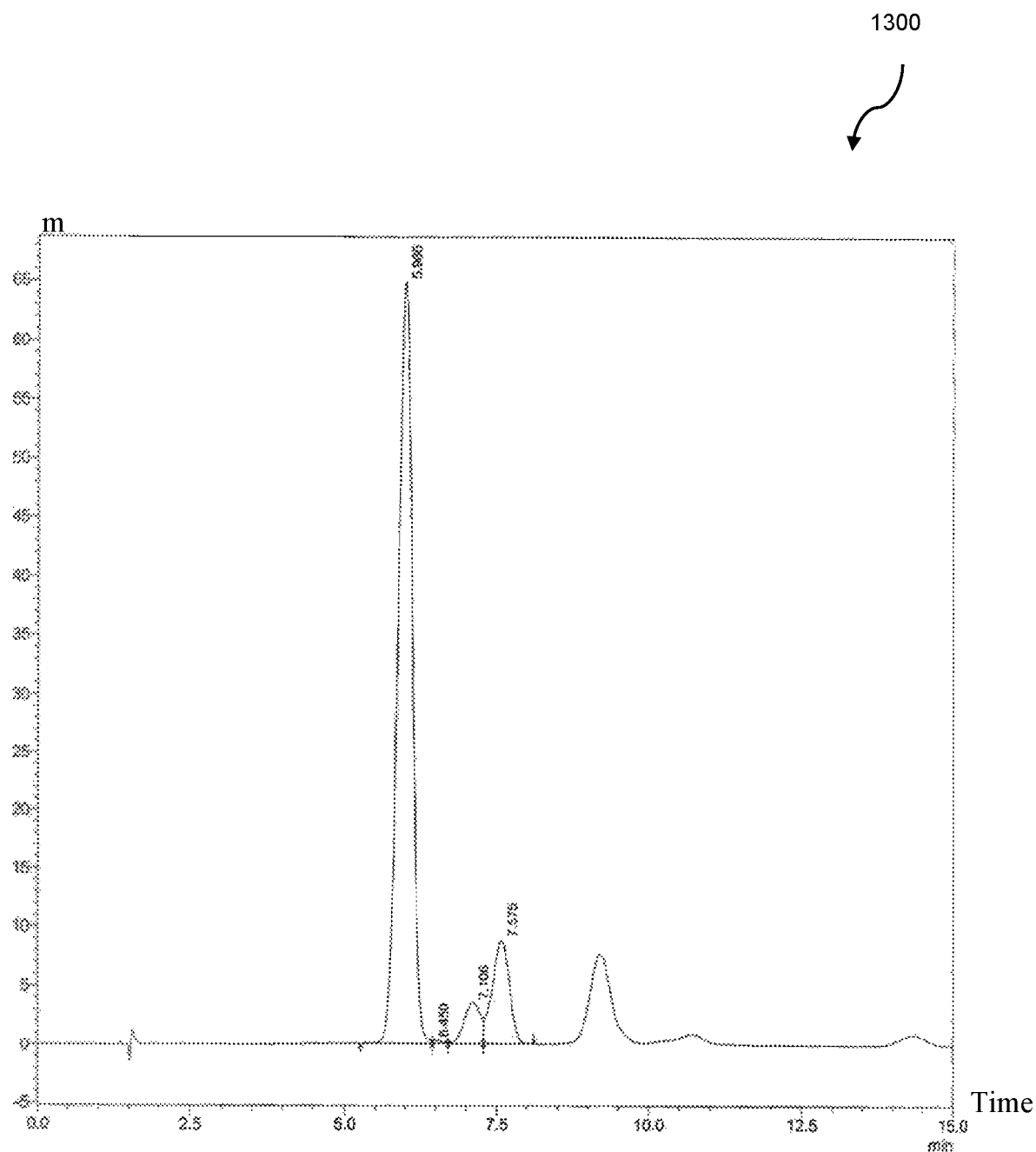
FIG. 13 shows the HPLC high-performance liquid chromatography chart of an extract sample from green microalgae (*H. pluvialis*) powder with the astaxanthin content of 10.9% raised from the green microalgae farming assembly of the present invention.

According to FIG. 13, a HPLC high-performance liquid chromatography chart 1300 of an extract sample from green microalgae (H. pluvialis) powder is illustrated. Based on the HPLC high performance liquid chromatography chart 1100 and Table 1, the astaxanthin content in green microalgae (H. pluvialis) powder extract is calculated to be 10.09%.

TABLE 3

The Peak Information and Area of the Sample Extracted from Green Microalgae (H. Pluvialis) Powder with Astaxanthin Content of 10.09%.

| No. | Peak | Area | Height | Area (%) | Height (%) |
|---|---|---|---|---|---|
| 1 | 5.986 | 1069025 | 64890 | 81.662 | 83.788 |
| 2 | 6.45 | 2846 | 264 | 0.217 | 0.341 |
| 3 | 7.106 | 65001 | 3488 | 4.965 | 4.504 |
| 4 | 7.575 | 172218 | 8803 | 13.156 | 11.367 |
| Total | | 1309090 | 77445 | 100 | 100 |

Thus, the high and stable astaxanthin content >5% has proven the effectiveness of the green microalga H. pluvialis farming method according to the invention.

The results of the astaxanthin content extracted from the green microalga (H. pluvialis) as described in FIG. 1 to FIG. 9 of the present invention is compared to other companies around the world including: Algalif (Iceland) and Algamo (Czech) company have a stable astaxanthin content at 5%, Astareal company (Japan) has a stable content of 5%. astaxanthin stabilized at 4%, NatAxtin company. The comparison is tabulated in Table 4.

TABLE 4

Comparison of the Astaxanthin Content Extracted from
the Green microalga (*H. pluvialis*) between Companies
in the world and the Present Invention.

| No. | Company | The Publication of the Concentration of Astaxanthin Extracted from Microalgae (*H. pluvialis*) |
|---|---|---|
| 1 | Algalif (Iceland) | 5% |
| 2 | Algamo (Czech) | 5% |
| 3 | Astareal (Japan) | 4% |
| 4 | NatAxtin (Chile) | 3%-4% |
| 5 | Algatechnologies (Israel) | 2.5%-3% |
| 6 | Bluebiotech (Germany) | 1.5-5% |
| 7 | YunNan (China) | 1.5%-3% |
| 8 | Norland (China) | 1.5%-3% |
| 9 | Cyanotech (USA) | 1%-2% |
| 10 | Present Invention | >5% |

Now referring to FIG. 14, a systematic diagram of a green microalgae (*H. pluvialis*) network 1400 (farming network 1400) in accordance with an exemplary embodiment of the invention is illustrated. In many embodiments, algae farming network 1400 includes a first algae farm 1400-1, a second algae farm 1400-2, . . . and an $J^{th}$ algae farm 1400-J, where J is a non-zero positive number. Each algae farm 1400-1, 1400-2, . . . 1400-J further includes a plurality of farming assemblies similar to farming assembly 100 as described in FIG. 1 or one constructed by method 700 described in FIG. 7. Specifically, first algae farm 1400-1 is located in distant geographical area such as Binh Duong province in VN and comprised a plurality of culture assemblies 100-11, 100-12, . . . , 100-1N, each is connected to one another by a local network 1401-1. Second algae farm 1400-2 is located in a different geographical area such as Lam Dong province in VN and comprised a plurality of culture assemblies 100-21, 100-12, . . . , 100-2M, each is connected to one another by a local network 1401-2. $J^{th}$ farm 1400-J is located in a distant geographical area such as Vinh Phuc province in VN and comprised a plurality of culture assemblies 100-J1, 100-J2, . . . , 100-JM, each is connected to one another by a local network 1401-J. Alternatively, first algae farm 1400-1, second algae farm 1400-2, . . . and $J^{th}$ algae farm 1400-J are located near one another in one slot of land.

Continuing with FIG. 14, first algae farm 1400-1, second algae farm 1400-2, and $J^{th}$ algae farm 1400-J are connected together by a network 1420 via communication channels 1499. Communication channels 1499 are wireless short-range communication channels, and long range wireless communication channels. Wireless short range communication channels include ZigBee™/IEEE 802.15.4, Bluetooth™, Z-wave, NFC, Wi-fi/802.11, cellular (e.g., GSM, GPRS, WCDMA, HSPA, and LTE, etc.), IEEE 802.15.4, IEEE 802.22, ISA100a, wireless USB, and Infrared (IR), LoRa devices, etc. when these algae farms are located near one another. Medium range wireless communication channels in this embodiment of communication link 1499 include Wi-fi and Hotspot. Long range wireless communication channels include UHF/VHF radio frequencies when algae these farms are located far from one another. Farm network 1400 also includes a plurality of local hubs or gateways 1410-1, 1410-2, . . . 1410-I that are also connected to network 1420 and to first algae farm 1400-1, second algae farm 1400-2, . . . and $J^{th}$ algae farm 1400-J. End-users 1411 such as farmers, owners, scientists, researchers can access to view and control each cultivation pouch 600 in first algae farm 1400-1, second algae farm 1400-2, . . . , and $J^{th}$ algae farm 1400-J via a software application program described in FIG. 9 rendered by a graphic user interface (GUI) (please see FIG. 16). A server computer 1540 is also connected to network 1420 via wireless communication channel 1499 to manage, store, and operate farm network 1400. Server computer 1540 may be a personal desktop computer, a laptop, a smart phone, or a tablet.

Next referring to FIG. 15, a schematic diagram of a server system 1500 that manage the farm network in accordance with an exemplary embodiment is illustrated. Server system 1500 includes a server computer 1540 electrically coupled to local gateways 1410-1 and to other distant gateways 1410-1, 1410-1 to 1410-N via a communication channel 1499 to network 1420 Server computer 1540 includes, but not limited to, input/output interface 1534, a storage device 1520, a central processing unit (CPU) 1530, a ROM/RAM for temporary memories 2250, a display unit 1537, a power supply unit 1531, an internet interface 1532, an audio/video board 1535, a keyboard 1536, and a transceiver 1539, all electrically coupled to one another via electrical connections 1599. These units are well-known computer components in the arts and need not be described in details here. It is noted that, non-limiting examples of network 1420 include the internet, cloud computing, Software as a service (Saas), Platform as a service (PaaS), Infrastructure as a service (IaaS), or permanent storage such as optical memory (CD, DVD, HD-DVD, Blue-Ray Discs), semiconductor memory (e.g., RAM, EPROM, EEPROM), and/or magnetic memory (hard-disk drive, floppy-disk drive, tape drive, MRAM) among others.

Storage device 1520 stores a OS/BIOS 1521 and a memory banks 1522, and a program green microalgae culture system controller 1510 (system controller 1510) In various embodiments of the present invention, server computer 1540 is a printed circuit board (PCB) with electrical connections 1599 are conducting wires such as copper, aluminum, gold, etc. In operation, server computer 1540 operates like a regular computer except that it is load with system controller 1510. System controller 1510 is executed by CPU 1530. Transceiver 1539 sends and receives information and instructions to each cultivation pouch 600 in array of cultivation pouches 310 in each algae farms 1400-1, 1400-2, . . . , and 1400-J. System controller 1510 is a software program described by FIG. 9 of the present invention.

Referring again to FIG. 15, system controller 1510 further includes a feedback data analyzer 1511, a controller module 1512, and a GUI module 1513. Feedback data analyzer 1511 receives green microalgae (*H. pluvialis*) information from each cultivation pouch 600 in array of cultivation pouches 310 in each algae farms 1400-1, 1400-2, . . . , and 1400-J and performs analytics on this information. Controller modules 1512 sends appropriate instructions to perform and maintain "homeostasis" of process 800. GUI module 1513 provides a display interface (see FIG. 16) so that end-users 1411 can view and control farm network 1400.

Referring to FIG. 16, a Graphical User Interface (GUI) displayed on the server computer for monitoring and controlling farm server 1400 in accordance with an exemplary aspect of the present invention is illustrated. Therein, GUI 1600 includes a number of function buttons from function button 1661 to function button 1670 arranged around a control and monitor area 1601. Control and monitor area 1601 provides data information representation of sensors 526 and 527 (see FIG. 5) in each farming assembly 100 and networked culture assemblies 100-11, 100-12 . . . 100-1N in first algae farm 1400-1; 100-21, 100-22, . . . 100-2M in second algae farm 1400-2; and 100-J1, 100-J2, . . . 100-JQ in $J^{th}$ algae farm. Specifically, some specific function buttons include but are not limited to function buttons: FILE button 1661 (file button); DESIGN button 1662 (table setup button); EDIT button 1663 (adjustment button); SINGLE VIEW button 1664 (showing a single farming assembly 100 as currently presented in FIG. 16); GROUP VIEW button 1665 (multiple culture farms 100 views); ANALYTICS button 1666 (data analysis from culture assemblies 100-11, 100-12, . . . 100-1N in first algae farm 1400-1; 100-21, 100-22, . . . 100-2M in second algae farm 1400-2; and 100-J1, 100-J2, . . . , 100-JQ in $J^{th}$ algae farm 'farm network 1400'); IMPORT DATA button 1667 (button to import data from farm network 1400); EXPORT DATA button 1668 (data export button to and from farm network 1400); SETTING button 1669 (GUI interface adjustment button); HOME button 1670 (button to return to default display).

Continuing with FIG. 16, FILE button 1661 (file button) is a drop-down menu that includes many sub-functions such as opening previous file, saving file; print file; closes the current file or window and the current information of the open file. DESIGN button 1662 (presentation setting button) helps select the presentation of data obtained from the sensor card in the form of tables and graphs, such as table shown in control and monitor area 1601. EDIT button 1663 allows changes to the data information of the file being displayed in control and monitor area 1601. SINGLE VIEW button 1664 and GROUP VIEW button 1665 displays data information from one or multiple farming assembly 100 of farm network 1400. ANALYTICS button 1666 performs analysis such as statistical analysis (e.g., analysis of variance 'ANOVA'), calculations. DESIGN button 1662 creates tables/charts for displaying essential information after analyzing data collected from farm network 1400.

Still referring to FIG. 16, IMPORT DATA button 1667 allows end-users 1411 to import data from a data storage device 1520 network hard drives or from cloud databanks, into the user interface 1600 to use function buttons from the user interface 1610 such as data analysis via the ANALYTICS button 1666. EXPORT DATA button 1668 export of data files containing farming data to and from other culture assemblies 100 in farm network 1400. SETTING button 1669 changes the default predetermined functions of user interface 1600 or the control and monitor area 1601. HOME button 1670 when executed returns to the screen display showing control and monitor area 1601.

Although the implementation options of the present invention are disclosed through the detailed description of the invention above, however, it should be understood that the invention is by no means limited to these implementation options. Experts in the same technical field admit that many other similar changes and arrangements could be made. Therefore, the scope of the invention is clearly defined to include all similar changes and arrangements within the scope of the following attached claims.

EXPLANATION OF REFERENCE NUMERALS

100 green microalgae (*H. Pluvialis*) farming assembly (assembly)
100-11 farming assembly in first algae farm
100-21 farming assembly in second algae farm
100-J1 farming assembly in $J^{th}$ algae farm
200 mechanical support framework (framework)
201 top rectangular frame
202 bottom rectangular frame
203 columns
204 caster or trolley wheels
205 hinges
206 screws
210 main housing unit
211 top bar
212 bottom bar
213 left outer side bar
214 right outer side bar
215 left inner side bar
216 right inner side bar
217 girt (reinforcement bar)
218 girt (reinforcement bar)
219 sliding wheels
220 LED lights support framework
221 top slider tracks
222 bottom slider tracks
223 pouch supporting bars
224 clip lines
225 hangers
310 array of cultivation pouches
410 LED and electrical wiring unit
411 LED light
412 power supply and/or regulator
413 positive power supply output
414 negative power supply output
418 male 2 pin insulated cap connectors
419 female 2 pin insulated cap connectors
421 positive power wire
422 negative power wire
423 ground wire
510 air and gas supply and distribution unit
511 $CO_2$ gas source
512 gas pump
513 gas valve
514 gas meter
515 air pump (aerator or mixer)
516 air valve
517 air meter
518 air stone
519 fluid tubes
525 computer
526 light sensors
527 temperature and other sensors such as pressure
520 monitoring and controlling unit
529 communication link
600 cultivation pouch
601 top portion of cultivation pouch
602 breather hole
603 body portion
604 bottom portion
605 culturing medium
611 green microalgae colony inside each cultivation pouch
621 air flow
1400 green algae farming network
1400-1 first algae farm
1400-2 second algae farm
1400-J $J^{th}$ algae farm
1401-1 first local network
1401-2 second local network
1401-J $J^{th}$ local network
1410-1 first gateway
1410-2 second gateway
1410-J $J^{th}$ gateway
1411 end-users
1499 wireless communication channels (links)
1500 server gateway system 1510 green microalgae culture system controller
1511 feedback & data analyzer module
1512 controller module
1513 GUI unit
1520 storage device
1521 OS/BIOS
1522 non-transitory memories
1530 CPU
1531 power supply
1532 internet interface
1533 ROM/RAM
1534 I/O interface
1535 audio/video
1536 keyboard
1537 display
1538 I/O driver
1539 transceiver
1540 server computer
1600 GUI
1601 display area
1602 cursor or pointing device
1603 single algae farming information display
1661 file command
1662 design command
1663 edit command
1664 single view
1665 group view
1666 analytics function
1667 import data
1668 export data
1669 setting command
1670 home command

What is claimed is:

1. A green microalga farming assembly, comprising:
a mechanical support framework;
a plurality of cultivation pouches, mechanically coupled to said mechanical support framework, having at least two arrays of cultivation pouches where green microalgae (*H. pluvialis*) are cultured;
a plurality of light emitting diodes (LEDs), mechanically coupled and supported by said mechanical support framework and arranged in between said at least two arrays of cultivation pouches, operable to provide predetermined light intensities to each of said at least two arrays of cultivation pouches;
an air and gas supply and distribution unit, mechanically coupled and supported by said mechanical support framework, operable to supply predetermined amounts of air and carbon dioxide ($CO_2$) to said at least two arrays of cultivation pouches; and
a monitoring and controlling computer, mechanically coupled and supported by said mechanical support framework, operable to maintaining said predetermined light intensities and said predetermined amounts of air and carbon dioxide ($CO_2$); wherein said monitoring and controlling computer unit is loaded with a software application program stored in a non-transitory memory when executed by a central processing unit (CPU), said software application program is operable to perform the following steps:
(a) biomass growing said green microalgae (*H. pluvialis*) by controlling said plurality of LED lights to emit said predetermined light intensities of 10 µmol photons/$m^2$/s for 5 days, and by controlling said $CO_2$ source and said air pump to generate temperature of 20° C. to 25° C.;
(b) varying said temperature from 28° C. to 30° C. and said predetermined light intensities to 400 µmol photons/$m^2$/s;
(c) biomass growing said green microalgae (*H. pluvialis*) by controlling said plurality of LED lights to emit said predetermined light intensities of 10 µmol photons/$m^2$/s for 5 days, and by controlling said $CO_2$ source and said air pump to generate temperature of 20° C. to 25° C.; and
(d) varying said temperature from 28° C. to 30° C. and said predetermined light intensities to 400 µmol photons/$m^2$/s.

2. The microalgae farming assembly of claim 1, wherein each of said plurality of cultivation pouches is made of soft durable and transparent medical grade plastic material selected from polyethylene and linear low-density polyethylene (LLDPE).

3. The microalgae farming assembly of claim 2, wherein said monitoring and controlling computer further comprises a plurality of temperature sensors, pressure sensors, light intensities sensors, and $CO_2$ sensors coupled to and supported by said mechanical support framework, operable to measure temperature, pressure, light intensities, and $CO_2$ gas in said at least two arrays of cultivation pouches.

4. The microalgae farming assembly of claim 1, wherein said mechanical support framework further comprises:
a main housing subunit having a cuboid shape;
a cultivation pouch supporting frame mechanically coupled to said main housing unit; and
LED supporting frames mechanically coupled to said main housing subunit.

5. The microalgae farming assembly of claim 4, wherein said main housing subunit further comprises:
a top rectangular frame;
a bottom rectangular frame; and
a plurality of columns connected to said top rectangular frame and bottom rectangular frame so as to form said cuboid shape.

6. The microalgae farming assembly of claim 5, wherein said cultivation pouch support frame further comprises a pouch hanging bar connected to said top rectangular frame for suspending said plurality of cultivation pouches.

7. The microalgae farming assembly of claim 6, wherein said LED supporting frames further comprises:
a top bar;
a bottom bar; and
at least two side bars connected to said top bar and said bottom bar, operable to electrically coupled to said plurality of LEDs; wherein said plurality of LEDs within said LED light support frame is arranged in between any two of said arrays of cultivation pouches.

8. The microalgae farming assembly of claim 1, wherein said air and gas supply and distribution unit further comprises:
an carbon dioxide ($CO_2$) source;
an gas valve;
a gas meter; and
a plurality of fluid tubes connected to said carbon dioxide source, said gas valve, and said gas meter to provide $CO_2$ gas to each of said at least two arrays of cultivation pouches.

9. The microalgae farming assembly of claim 8, wherein said air and gas supply and distribution unit further comprises:
an air pump;
an air valve;
an air meter; and said plurality of fluid tubes connected to said air pump, said air valve, and said air meter provide $CO_2$ gas to each of said at least two arrays of cultivation pouches.

10. The microalgae farming assembly of claim 1, wherein each of said cultivation pouches is made of a transparent plastic material capable of receiving said predetermined light intensities from said plurality of LEDs.

11. The microalgae farming assembly of claim 10, wherein each of said at least two arrays of cultivation pouches comprises an optimal *Haematococcus* Medium (OHM) consisted of 0.41g $KNO_3$; 0.03 g $Na_2HPO_4$; 0.246 g $MgSO_4 \cdot 7H_2O$; 0.11 g $CaCl_2 \cdot 2H_2O$; 2.62 mg $FeC_6H_5O_7$, 0.011 mg $CoCl_2$; 0.012 mg $CuSO_4$, 0.075 mg $Cr_2O_3$; 0.98 mg $MnCl_2$; 0.12 mg $Na_2MoO_4$; 0.005 mg $SeO_2$; 25 µg biotin; 17.5 µg thiamine; and 15 µg vitamin $B_{12}$ per one liter.

12. The microalgae farming assembly of claim 2, wherein said monitoring and controlling computer unit is operative to communicate with monitoring and controlling computer units installed in different microalgae farming assemblies via a cloud network.

13. The microalgae farming assembly of claim 12, further comprising a step of harvesting astaxanthin by freeze drying said green microalgae (*H. pluvialis*).

14. A method of farming and harvesting green microalgae (*H. pluvialis*), comprising:
    (a) constructing a framework that supports a cultivation for said green microalgae (*H. pluvialis*);
    (b) biomass growing said green microalgae (*H. pluvialis*) by controlling a plurality of LEDs and a $CO_2$ source and an air pump to generate a temperature between 20° C. to 25° C. and light intensities to 10 µmol photons/$m^2$/s for 5 days; and
    (c) varying said temperatures from 28° C. to 30° C. and said predetermined light intensities to 400 µmol photons/$m^2$/s.

15. The method of claim 14 further comprising a step of harvesting astaxanthin from said green microalgae (*H. pluvialis*) by removing and freeze drying said green microalgae (*H. pluvialis*).

16. The method of claim 14, wherein said green microalgae (*H. pluvialis*) is cultivated in an Optimal *Haematococcus* Medium (OHM) that consisted of 0.41g $KNO_3$; 0.03 g $Na_2HPO_4$; 0.246 g $MgSO_4 \cdot 7H_2O$; 0.11 g $CaCl_2) \cdot 2H_2O$; 2.62 mg $FeC_6H_5O_7$; 0.011 mg $CoCl_2$; 0.012 mg $CuSO_4$; 0.075 mg $Cr_2O_3$; 0.98 mg $MnCl_2$; 0.12 mg $Na_2MoO_4$; 0.005 mg $SeO_2$; 25 µg biotin; 17.5 µg thiamine; and 15 µg vitamin $B_{12}$ per one liter.

17. The method of claim 16, wherein said constructing a green microalgae farming assembly further comprises:

constructing a mechanical support framework;
constructing and coupling at least two arrays of cultivation pouches, to said mechanical support framework, wherein said at least two arrays of cultivation pouches contain said OHM;
constructing and coupling at least two arrays of light emitting diodes (LEDs), to said mechanical support framework and arranging said at least two arrays of LEDs in between said at least two of arrays of said cultivation pouches, wherein said LEDs are operable to provide said predetermined light intensities to each of said at least two of arrays of said cultivation pouches; and
constructing and coupling an air and gas distribution unit to said mechanical support framework, wherein said air and gas distribution unit is operable to supply predetermined amounts of air and carbon dioxide ($CO_2$) to each of said at least two of arrays of said cultivation pouches.

18. The method of claim 14, wherein said step (a) of constructing a framework further comprises:
constructing and coupling a monitoring and controlling computer to said mechanical support framework; wherein said monitoring and controlling computer is operable to maintaining said predetermined light intensities and said predetermined amounts of air and carbon dioxide ($CO_2$) to each of said at least two of arrays of said cultivation pouches.

19. The method of claim 18, wherein said step of constructing and coupling a monitoring and controlling computer further comprises a plurality of temperature sensors, pressure sensors, light intensities sensors, and gas sensors mechanically coupled to said mechanical support framework, operable to measure temperature, pressure, $CO_2$ and air, and light intensities in each of said at least two of arrays of said cultivation pouches.

20. The method of farming and harvesting green microalgae (*H. pluvialis*) further comprising networking said plurality of said green microalgae farming assemblies by a cloud network and a server computer, wherein said server computer is loaded with a software application stored in a non-transitory memory, wherein when executed by a central processing unit (CPU) of said server computer, said software application is operable to perform the following steps:
    (g) monitoring cultivation conditions in each of said at least two of arrays of said cultivation pouches; and
    (h) if said cultivation conditions are different from said predetermined light intensities and said predetermined amounts of air and carbon dioxide ($CO_2$), adjusting said temperature, said pressure, said $CO_2$ and air, and said light intensities to said predetermined light intensities and said predetermined amounts of air and carbon dioxide ($CO_2$).

* * * * *